US009754410B2

(12) United States Patent
Hua et al.

(10) Patent No.: US 9,754,410 B2
(45) Date of Patent: Sep. 5, 2017

(54) SYSTEM AND METHOD FOR THREE-DIMENSIONAL GARMENT MESH DEFORMATION AND LAYERING FOR GARMENT FIT VISUALIZATION

(71) Applicant: StyleMe Limited, Ebene (MU)

(72) Inventors: Jonathan Leong Zhan Hua, Taipei (TW); Chi-Han Peng, Kaoshiung (TW)

(73) Assignee: StyleMe Limited (HK)

( * ) Notice: Subject to any disclaimer, the term of this patent is extended or adjusted under 35 U.S.C. 154(b) by 0 days.

(21) Appl. No.: 15/433,448

(22) Filed: Feb. 15, 2017

(65) Prior Publication Data

US 2017/0161948 A1 Jun. 8, 2017

(51) Int. Cl.
*G06T 17/20* (2006.01)
*A41H 1/02* (2006.01)
*G06T 7/73* (2017.01)

(52) U.S. Cl.
CPC ............. *G06T 17/205* (2013.01); *A41H 1/02* (2013.01); *G06T 7/75* (2017.01); *G06T 2200/24* (2013.01); *G06T 2207/10028* (2013.01); *G06T 2210/16* (2013.01)

(58) Field of Classification Search
None
See application file for complete search history.

(56) References Cited

U.S. PATENT DOCUMENTS

| 6,546,309 B1 | 4/2003 | Gazzuolo |
| 2009/0115777 A1 | 5/2009 | Moreno |
| 2011/0298897 A1 | 12/2011 | Sareen et al. |
| 2012/0062555 A1 | 3/2012 | O'Connor et al. |
| 2012/0095589 A1 | 4/2012 | Vapnik |
| 2013/0057544 A1* | 3/2013 | Oh .......................... G06Q 30/06 345/419 |
| 2014/0035913 A1 | 2/2014 | Higgins et. al. |
| 2014/0279289 A1 | 9/2014 | Steermann |

(Continued)

FOREIGN PATENT DOCUMENTS

| CN | 102567602 | 7/2012 |
| CN | 202615450 | 12/2012 |

(Continued)

OTHER PUBLICATIONS

Sorkine, et al., "*Lapracian Surface Editing*," Proceedings of the Eurographics Symposium on Geometry Processing; 2004, pp. 179-188.

(Continued)

*Primary Examiner* — Nicholas R Wilson
(74) *Attorney, Agent, or Firm* — DLA Piper LLP (US)

(57) ABSTRACT

Systems and methods for three-dimensional polygonal garment mesh deformation and/or layering for garment fit visualization. A deformation engine receives at least one garment mesh fitted to a template body mesh and deforms the garment mesh to a target body mesh according to a geometrical deformation algorithm. A layering engine receives plural garment meshes that are separately fitted to a target body mesh, and deforms the plural garment meshes according to an iterative layering process that deforms each individual garment mesh according to a layering order while preventing intersections between other garment meshes and the target body mesh.

28 Claims, 23 Drawing Sheets

(56) References Cited

U.S. PATENT DOCUMENTS

| | | |
|---|---|---|
| 2014/0368499 A1 | 12/2014 | Kaur |
| 2015/0154691 A1 | 6/2015 | Curry et al. |
| 2015/0269291 A1* | 9/2015 | Sekine ............... G06F 17/5009 703/1 |
| 2016/0063588 A1 | 3/2016 | Gadre et al. |

FOREIGN PATENT DOCUMENTS

| | | |
|---|---|---|
| KR | 10-2015-0097903 | 8/2015 |
| WO | 2014/022608 A2 | 2/2014 |

OTHER PUBLICATIONS

Volino, et al., "*From Early Virtual Garment Simulation to Interactive Fashion Design,*" Computer-Aided Design 37; Sep. 15, 2004, pp. 593-608.

Lipman, et al., "*Linear Rotation-Invariant Coordinates for Meshes,*" ACM Transactions on Graphics; 2005 (9 pages).

Decaudin, et al., "*Virtual Garments: A Fully Geometric Approach for Clothing Design,*" Eurographics; 2006, vol. 25, No. 3 (10 pages).

Sorkine, et al., "*As-Rigid-As-Possible Surface Modeling,*" Proceedings of the Eurographics Symposium on Geometry Processing: 2007, pp. 109-116.

Botch, et al., "*On Linear Variational Surface Deformation Methods,*" IEEE TVCG 14, 1, 2008, pp. 213-230.

Ben-Chen, et al., "*Variational Harmonic Maps for Space Deformation,*" ACM Transactions on Graphics; 2009 (ACM Siggraph 2009) (11 pages).

Botch, et al., "*Polygon Mesh Processing.,*" 2010 (1 page).

Umetani, et al., "*Sensitive Couture for Interactive Garment Modeling and Editing,*" 2011, ACM Transactions on Graphics (ACM Siggraph 2011) (11 pages).

Brouet, et al., "*Design preserving Garment Transfer,*" 2012, (ACM Siggraph 2012) (12 pages).

Meng, et al., "Flexible Shape Control for Automatic Resizing of Apparel Products," CAD 44, 2012, pp. 1-10.

Berthouzoz, et al., "Parsing Sewing Patterns into 3D Garments," 2013, ACM Transactions on Graphics (ACM Siggraph 2013) (11 pages).

Bartle, et al., "*Physics-driven Pattern Adjustment for Direct 3D Garment Editing,*" 2016, ACM Transactions on Graphics (ACM Siggraph 2016) (11 pages).

"*Body Labs,*" https:www.bodylabs.com/, printed Jan. 17, 2017 (4 pages).

"*Optitex Fashion Design Software, 3D Virtual Photocopying,*"http:optitex.com, printed Jan. 17, 2017 (5 pages).

"*CLO 3D Fashion Design Software,*" http://clo3d.com/, printed Jan. 17, 2017 (1 page).

Tang, et al., "*Fast Continuous Collision Detection Using Deforming Non-Penetration Filters,*" 2010, Proceedings of the 2010 ACM SIGGRAPH Symposium on Interactive 3D Graphics and Games (7 pages).

Müller, et al., "*Air Meshes for Robust Collision Handling,*" 2015, ACM Transactions on Graphics (TOG)—Proceedings of ACM SIGGRAPH 2015, pp. 1-9.

"*Bounding Volume,*" https://en.wikipedia.org/wiki/Bounding_volume, printed Jan. 17, 2017 (6 pages).

"Algorithm—Find Whether Two Triangles Intersect or Not," Stack Overflow, http://stackflow.com/questions/7113344/find-whether-two-triangles-intersect-or-not, printed Jan. 17, 2017 (2 pages).

Hauswiesner, et al., "*Free Viewpoint Virtual Try-On With Commodity Depth Cameras,*" Retrieved on May 13, 2016, http://www.icg.tugraz.at/kinectclothpaper (8 pages).

Randall, "*Fashion ecommerce: are virtual filling rooms the silver bullet?,*" Feb. 9, 2015, https://econsultancy.com/blog/66058-fashion-ecommerce-are-virtual -fitting-rooms-the-silver-bullet (10 pages).

"Fashionme," Retrieved on May 13, 2016, http://cordis.europa.cu/project/ren/54101_en.html (3 pages).

Barnett, "Online clothes-shopping: is an avatar the answer?," Feb. 29, 2012, http://www.theguardian.com/fashion/shortcuts/2012/feb/29/online-clothes-shopping-avatar (3 pages).

Zolfagharifard, "*Is this the end of changing rooms? App creates a virtual reality fitting service for shoppers to 'try on' clothes,*" Jun. 17, 2015, Dailymail.com (4 pages).

Khalil, "*The 3D virtual environment online for real shopping,*" 2015, Computer Science and Information Technology Department, Computer Solution Center, arXiv:1512.02372 (7 pages).

Hinderer, et al., "A Platform for Fashion Shopping with Individualized Avatars and Personalized Customer Consulting," Apr. 12, 2016, Research Gate, pp. 1-7.

\* cited by examiner

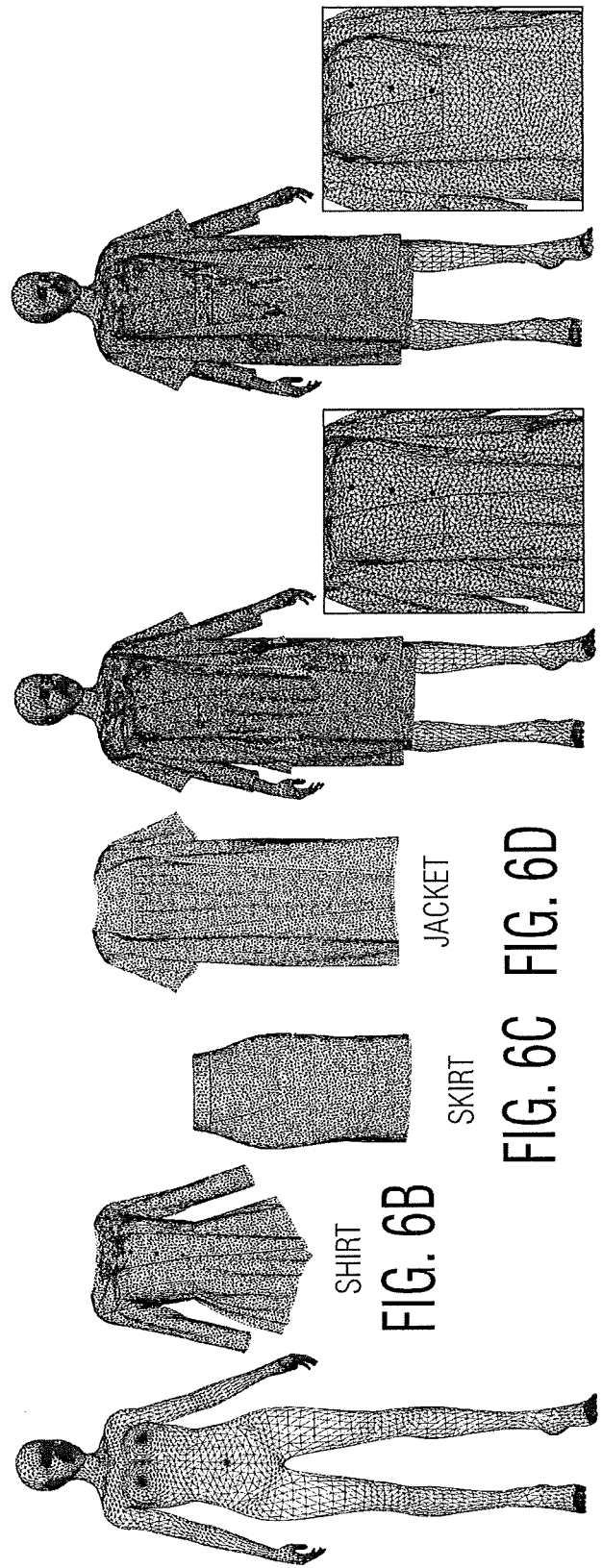

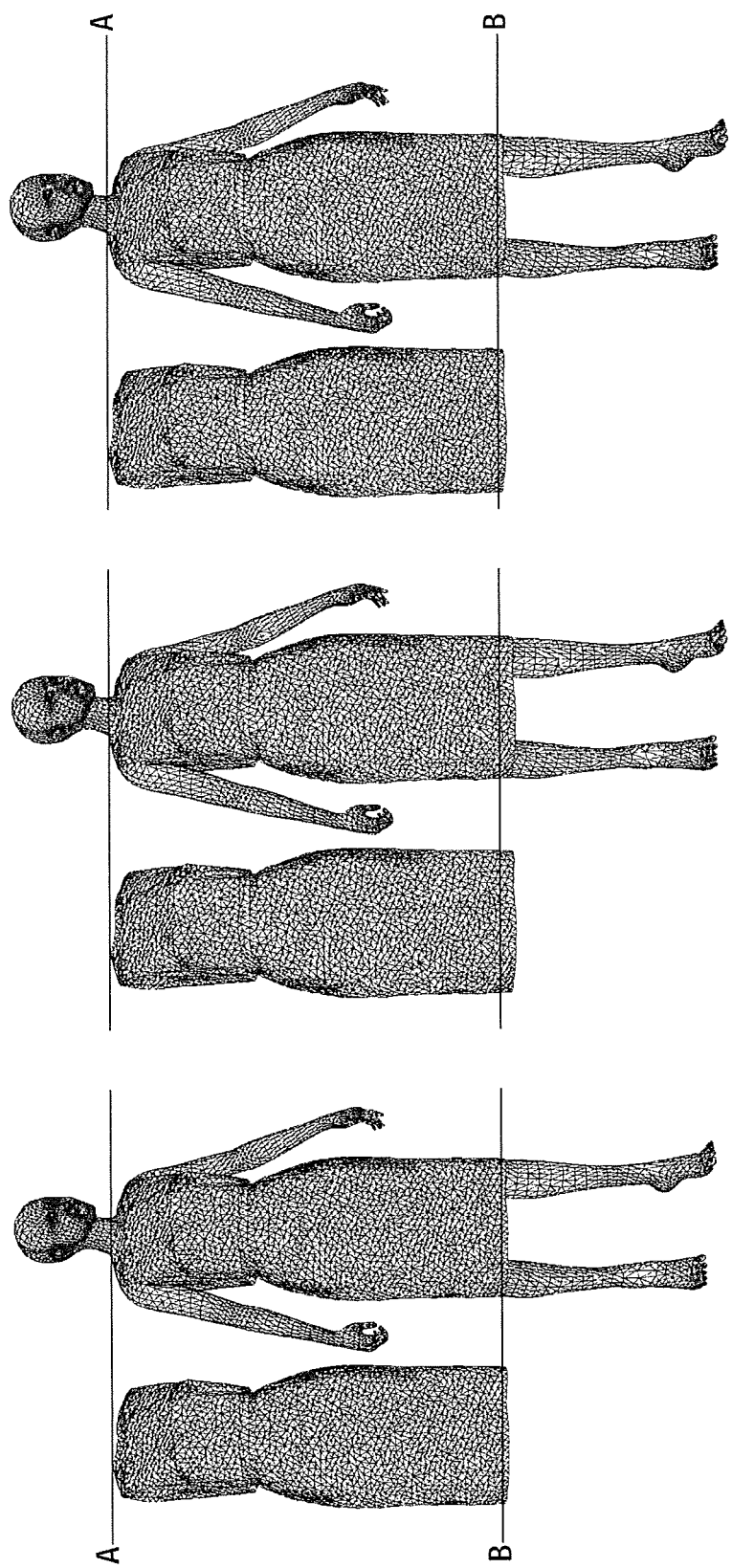

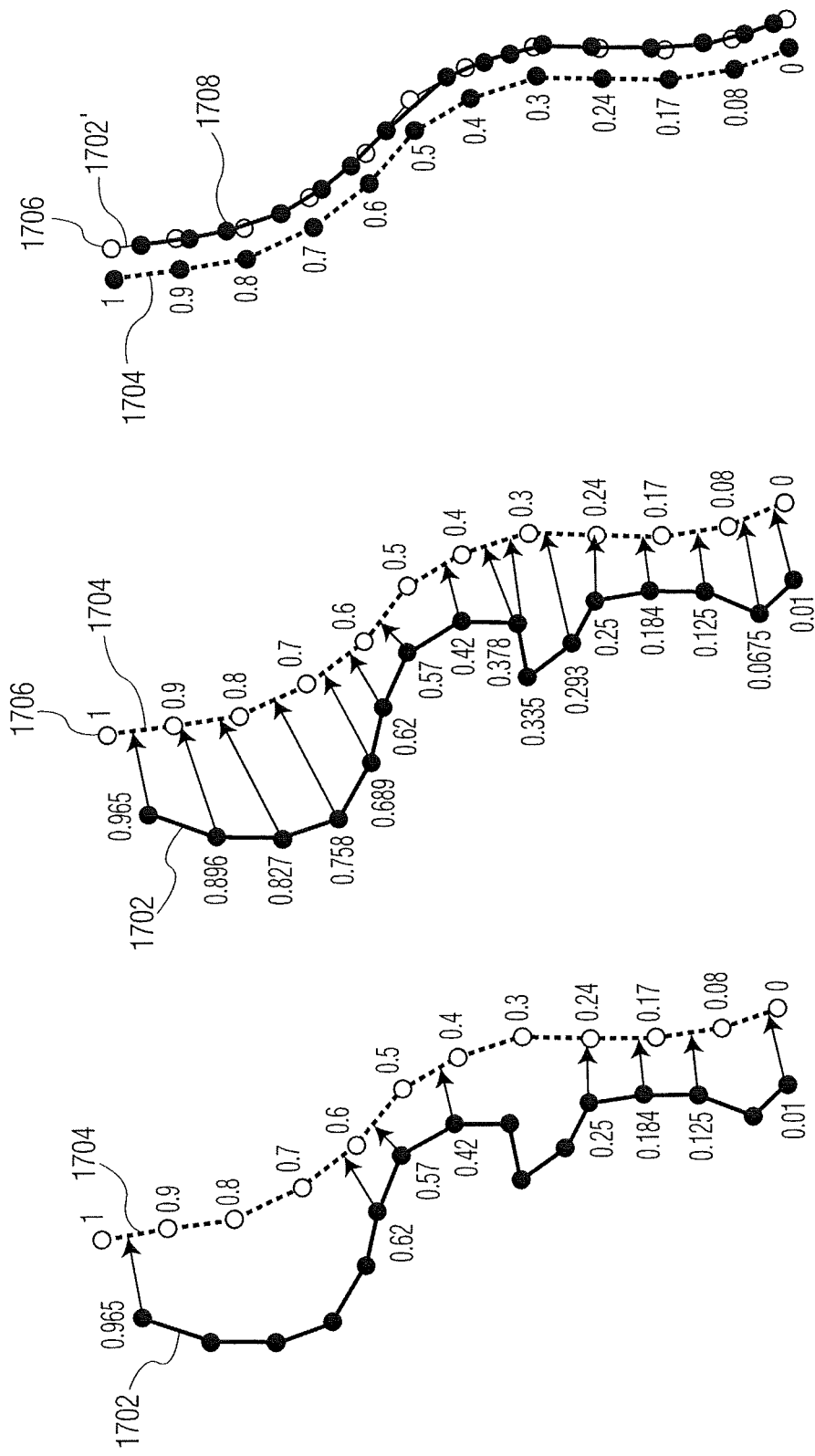

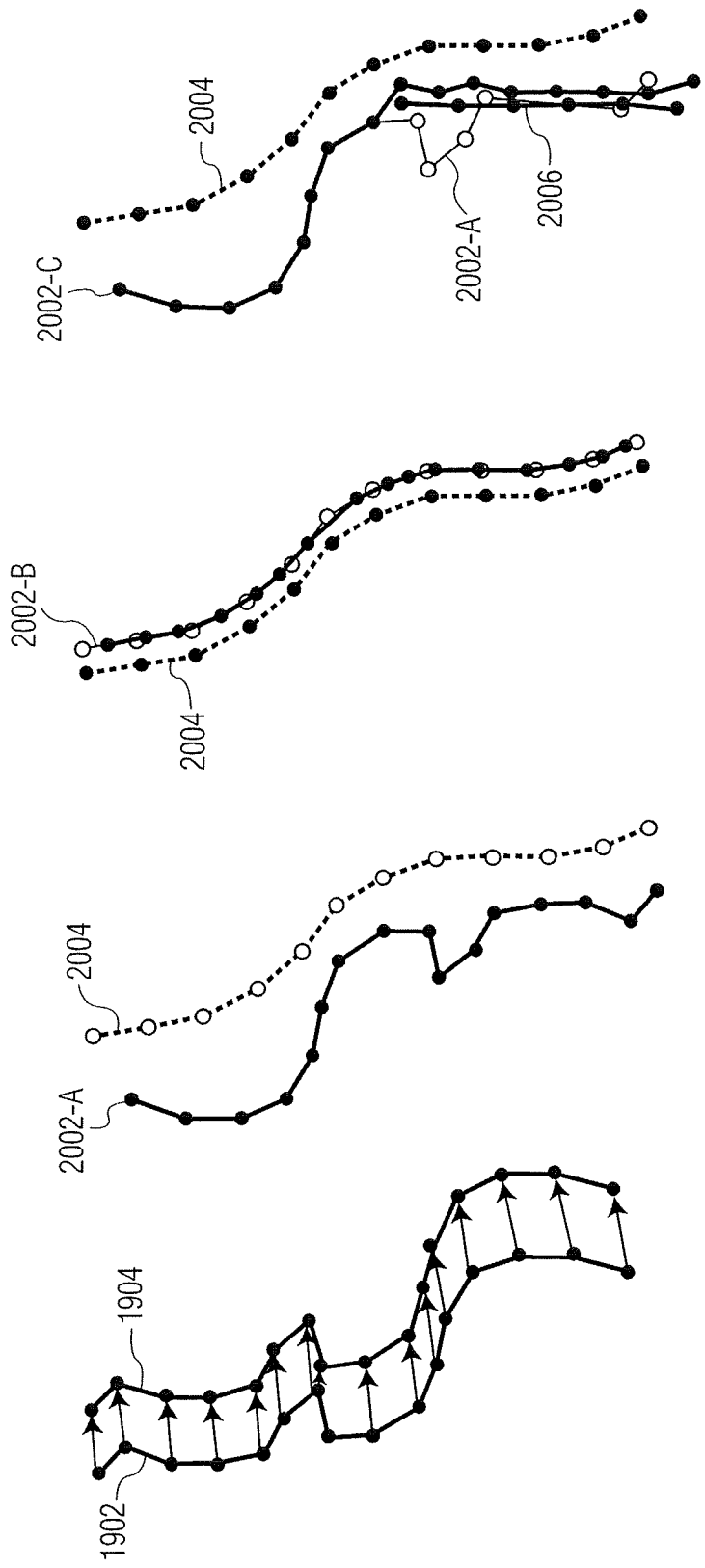

SYSTEM AND METHOD FOR THREE-DIMENSIONAL GARMENT MESH DEFORMATION AND LAYERING FOR GARMENT FIT VISUALIZATION

TECHNICAL FIELD

The present disclosure relates to the field of garment fit and, more specifically, to the generation of three-dimensional (3D) polygonal meshes representing one or more garments deformed and/or layered with respect to a body mesh for visualization of garment fit.

BACKGROUND

It is known to digitize garments and human bodies in the form of 3D polygonal meshes. In some examples, garment meshes may be generated in a state as if already being fitted to or worn on human bodies (i.e., instead of being laid flat). This arrangement may be useful in situations such as visualization, for example, of garment fit. In some examples, a garment mesh may be provided in a state such that it may already be fitted on a human body of a particular body size. Typically, the garment mesh may not be compatible with a body of a different size. For example, a t-shirt fitted on a large body may appear baggy on a smaller body, and vice versa. In addition, intersections may be generated between the garment mesh and a differently-sized body mesh (e.g., a body mesh generated for a different body size) when the garment mesh is applied to the new body mesh.

It is also known to generate garment meshes based on physical cloth simulation techniques. These techniques typically rely on two-dimensional (2D) garment patterns that are then stitched together and fitted onto 3D avatars. The technique typically treats cloth like a grid work of particles connected to each other by springs, to determine the position and shape of the fabric. Physical cloth simulation typically uses a physical model that accounts for cloth characteristics such as stretch, stiffness, and weight. Physical cloth simulation techniques, however, are computationally intensive, and may be unattainable in a real-world setting.

It is also known to generate multiple polygonal meshes representing different garments that are individually fitted on the same human body. For example, in a 3D scan pipeline, the 3D scans of multiple garments fitted on a same mannequin are typically acquired individually. It may be cost prohibitive to acquire the 3D scans of multiple pieces layered together, due to the large numbers of the possible combinations. In addition, intersections between meshes may occur if multiple polygonal meshes representing different garments are simply combined together, because the shape of each does not consider the existence of the others.

There is a need for systems and methods to induce new shapes of garment meshes as if they are fitted on differently-sized bodies, that is efficient and simple to implement, and that does not rely on physical cloth simulation techniques (which can be time-consuming or simply unattainable in real-world settings). There is also a need for systems and methods that layer multiple garment meshes while resolving intersections between the multiple garment meshes when layered together.

SUMMARY

Aspects of the present disclosure relate to systems and methods for deforming a polygonal mesh representing a garment fitted on a template body to a target body. The system may include an input interface, a deformation engine and an output interface. The input interface may be configured to: receive a target body mesh representing the target body; receive a template body mesh having a plurality of template body vertices and representing the template body, where the target body mesh may be different from the template body mesh; and receive a garment mesh having a plurality of garment vertices and representing the garment, the garment mesh fitted to the template body mesh. The deformation engine may be configured to: deform the garment mesh to the target body mesh by a geometrical deformation algorithm. The geometrical deformation algorithm includes, for each garment vertex: identifying one or more of the template body vertices and one or more others of the garment vertices each within a predetermined threshold (in terms of distances and surface normal alignments) of the garment vertex; applying a predetermined weighting to each identified template body vertex and each identified other garment vertex; mapping the garment vertex to the one or more identified template body vertices based on a sum of the weighted template body vertices and the weighted garment vertices; determining a position of the mapped garment vertex relative to the target body mesh based on a mapping between the template body mesh and the target body mesh, such that the garment vertex is deformed according to the position, and repeating the identifying, applying, mapping and determining steps for each garment vertex of the garment mesh to form a deformed garment mesh fitted to the target body mesh. The output interface may be configured to output the deformed garment mesh.

Another aspect of the present disclosure relates to systems and methods for layering a plurality of polygonal meshes representing a plurality of garments fitted on a target body. A layering method includes: receiving, by an input interface, a target body mesh representing the target body; receiving, by the input interface, a plurality of garment meshes representative of the respective plural garments, each garment mesh separately fitted to the target body mesh; assigning a layering order to each of the plurality of garment meshes from a closest layer to a furthest layer with respect to the target body mesh; and performing, by a layering engine, a layering process for each assigned layer, according to a sequential order from a next furthest layer to the closest layer. The layering process includes, for each garment mesh in the sequential order: collapsing the garment mesh onto the target body mesh by mapping each vertex of the garment mesh to a respective corresponding location on the target body mesh, to form a collapsed garment mesh; expanding at least one outer garment mesh farther from the garment mesh in the layering order away from the target body by a predetermined amount to form at least one expanded outer garment mesh; performing a shape-recovery of the collapsed garment mesh by deforming each vertex of the collapsed garment mesh toward the at least one expanded outer garment mesh without intersecting the expanded outer garment mesh, to form a shape-recovered garment mesh for the corresponding layering order; repeating the collapsing, expanding and shape-recovery steps until a shape-recovered garment mesh is generated for the closest layer, to form a set of layered garment meshes; and outputting, by an output module, the set of layered garment meshes.

BRIEF DESCRIPTION OF DRAWINGS

FIGS. 6A, 6B, 6C, 6D, 6E, 6F, 6G and 6H illustrate various 3D polygonal meshes associated with an example garment layering process, according to an aspect of the present disclosure.

FIGS. 15A, 15B and 15C illustrate a length adjustment process of a garment mesh with respect to a body mesh, according to an aspect of the present disclosure.

FIGS. 17A, 17B and 17C are two-dimensional illustrations of a collapse process for a 3D garment mesh, according to an aspect of the present disclosure.

FIG. 19 is a two-dimensional illustration of a one-to-one mapping connected with an expand process for a 3D polygonal mesh, according to an aspect of the present disclosure.

FIGS. 20A, 20B and 20C are two-dimensional illustrations of a shape-recovery process for 3D garment meshes, according to an aspect of the present disclosure.

DETAILED DESCRIPTION

Figure 1:
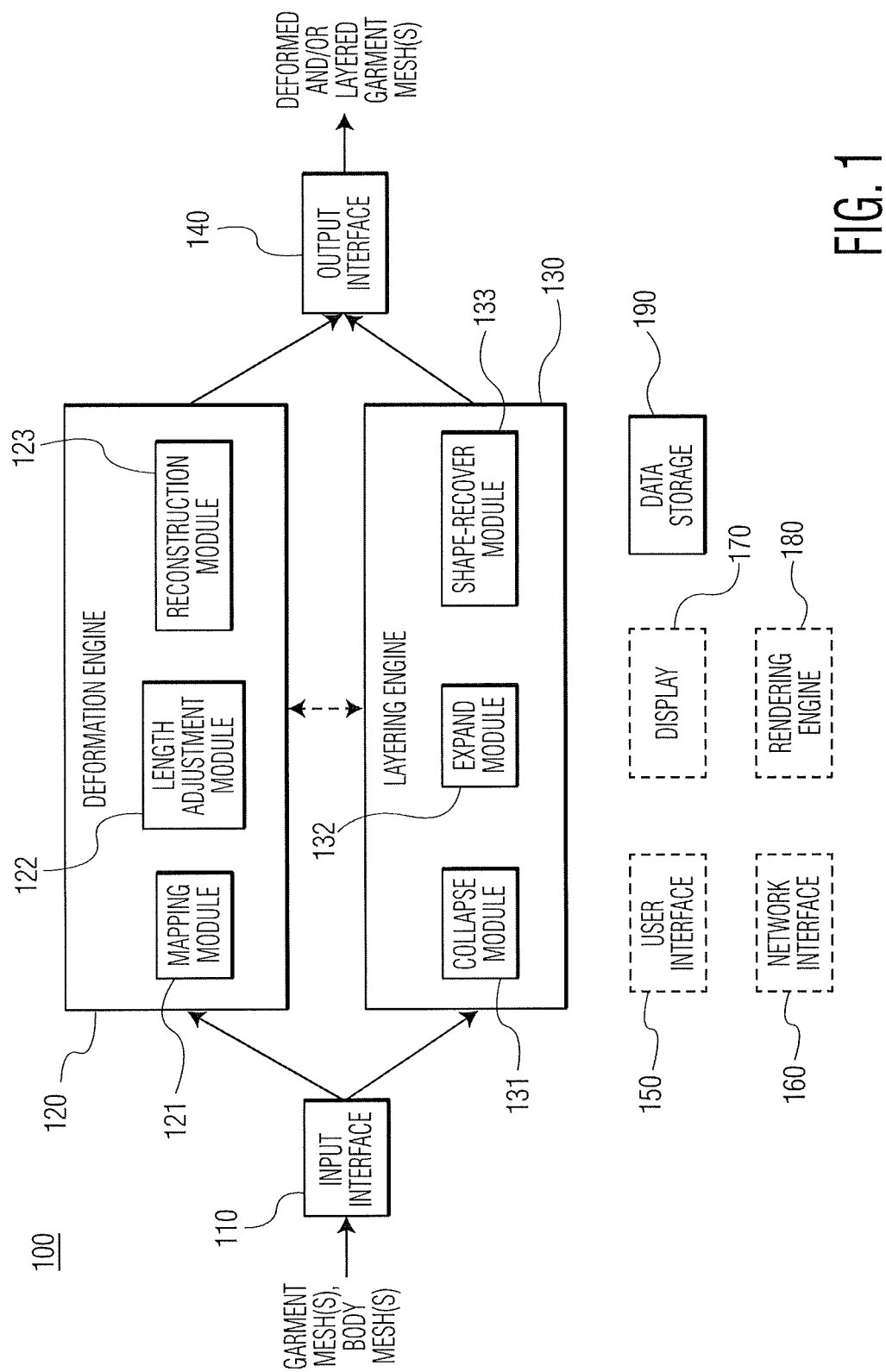
FIG. 1 is a functional block diagram of an example system for deforming and/or layering garment meshes with respect to a body mesh, according to an aspect of the present disclosure.

Aspects of the present disclosure generally relate to systems and methods for deforming at least one polygonal mesh representing a garment onto a polygonal mesh representing a body, as if the represented garment is worn on the represented body. In one aspect, the disclosed systems and methods may be used to visualize the fit of the garment onto the body. It should be understood, however, that the systems and methods described herein are not limited thereto, but instead may be used in other suitable applications.

According to aspects of the present disclosure, systems and methods for deforming a polygonal mesh representing a garment fitted on a template body to a target body may be provided. In some examples, a system may include a deformation engine configured to receive at least one garment mesh fitted to a template body mesh and deform the garment mesh such that it is fitted onto the target body mesh. In some examples, the deformation engine may perform a deformation process based on a geometrical deformation algorithm that does not use physical cloth simulation techniques. The deformation process may include mapping of the garment mesh to the target body mesh, to deform the garment mesh to the target body mesh. The deformation process may also include performing a length adjustment on the deformed garment mesh, such that the length of the garment mesh corresponds to the original garment mesh. The deformation process may also include reconstructing the deformed garment mesh to eliminate any self-intersections of the deformed garment mesh, and any intersections between the garment mesh and the target body mesh. The template body mesh may be different from the target body mesh. For example, a shape, a size and/or a pose of the template body mesh may be different from the target body mesh.

In some examples, criteria for the deformation process may include providing that the new shape retains the overall length of the original garment, providing the new garment shape such that it mimics the details, such as winkles, drapes, etc., of the original garment; and providing the spacing between the deformed garment mesh and the target body mesh such that the spacing is similar to the spacing between the original garment and template body meshes, i.e., the level of tightness may be similar (or the same) after the deformation process. For purposes of the present disclosure, level of tightness may be understood to mean a spacing between the garment mesh and the body mesh. In general, level of tightness describes how the cloth of the garment is fitted on the body (e.g., very tight to very loose). This means that a garment would be enlarged if fitted to a bigger new body shape, and vice versa. Another criteria for the deformation process may include that the new garment mesh be free of self-intersections and intersections with the new body. In general, the shapes of the modified garment meshes may become larger, smaller, shifted upwards or downwards, according to the size of the target body mesh with respect to the original template body mesh.

In some examples, the present disclosure is also related to systems and methods of layering of plural garment meshes onto a target body mesh. In some examples, a system may include a layering engine configured to receive two or more garment meshes, each separately fitted to a target body mesh and may perform a geometric layering process that iteratively deform garment meshes according to a layering order, to form a set of layered garment meshes. The deformation may include collapsing a specific (inner) garment mesh in the layering order onto the target body mesh, expanding outer garment mesh(s) to accommodate the inner garment mesh and shape-recovering the inner (collapsed) garment mesh toward the outer expanded garment such that the inner garment mesh does not intersect the outer expanded garment meshes and does not intersect the target body mesh.

In some examples, the layering process may resolve intersections between multiple polygonal meshes representing garments that were individually fitted on the same human body. The layering method may take a layering-inspired approach to deform the individual garments. The layering method may resolve all intersections between multiple garments when put together, by making small-scale modifications to each of the garment meshes. The layering method may apply a layering order, i.e., the order from the inner most piece (closest to the body) to the outer most piece. For example, given a shirt, a pant, and a jacket, one possible order is shirt-pant-jacket, meaning that the shirt is tucked inside the pant, and the jacket is worn on top of them. Different layering orders may lead to different results, for example, a more awkward looking order. For example, a layering order of jacket-pant-shirt, means that the jacket is tucked inside the pant, and both worn inside the shirt.

A goal of the layering system and method of the present disclosure may include layering two or more garment meshes onto a geometric shape, (e.g., a body mesh) such that no intersections exist between any pair of the garment meshes or between each of the garment meshes and the body mesh. Additionally, the layering process may desirably provide layered garment meshes that stay as close as possible to their original shapes.

In some examples, systems and methods of the present disclosure may include both individual (separate) deformation of plural garment meshes to a target body mesh and subsequent layering of the plural deformed garment meshes onto the target body mesh.

According to aspects of the present disclosure, the deformation and layering processes may be geometry-based. Thus, no physical-based techniques, such as physical cloth simulation, may be used to generate the deformed and layered garment meshes. Because the deformation process of the present disclosure is directed to geometric techniques, the geometrically-based deformation process is computationally more efficient and computationally faster compared to computationally intensive physical-based techniques.

For example, two conventional physical-based cloth simulation systems may be compared with the geometrical deformation process of the present disclosure. Optitex PDS (available from EFI/Optitex, a division of Electronics For Imaging, Inc., California) is more computationally expensive but may produce more physically realistic results (e.g., with realistic-looking wrinkles, stretches, etc.). Clo 3D (available from CLO Virtual Fashion, Inc., New York City) is noticeably faster, but the results are more smoothed-out, lacking the details. In regards to performance, two kinds of tasks should be considered. The first is to simply put one article of clothing on a target body (i.e., a garment deformation process), the second is to put multiple articles of clothing simultaneously on the target body (i.e., a garment layering process).

For the deformation task, Optitex PDS requires a couple of minutes to finish the process (depending on the complexity of clothes), while Clo 3D requires a few to ten seconds to compute an initial solution, and a brief manual editing session by 3D artists (which may take another few minutes) if the initial solution is not satisfactory. Both estimates assume the clothes are initially given in a laid-down, flat state (i.e., as is typical of 2D patterns).

In contrast, the garment deformation process of the present disclosure may take up to a few seconds to finish. One reason for the vastly more efficient process is that the present disclosure uses clothes that are given in a 3D, fitted state already worn on a template body model, not 2D patterns. The present disclosure morphs the clothes toward the target body model. Such morphing is a pure geometric process without any physical considerations, and may be performed very efficiently.

Putting multiple clothes simultaneously onto a body (i.e., a layering process), typically cannot be performed in a reliable manner with some prior art systems such as Optitex PDS. Although it may be performed by other prior art systems such as Clo 3D, the process usually requires a few seconds to complete. In contrast, the layering method of the present disclosure is faster than these prior art systems; completing the layering process, for example, in no more than one or two seconds.

An additional performance issue with physical-based approaches is they do not mimic details reliably. Typically, existing details such as wrinkles, creases and the like diminish, and new details are created. In addition to performance issues, physical-based cloth simulation techniques are unattainable for many applications due to requirements that the cloth models are in the form of 2D patterns (in the ideal case), or at least high-quality 3D polygonal meshes (e.g., uniformly and regularly tessellated, smooth—no pre-"baked" geometric details, and no holes and other mesh problems). In a performance setting such as a 3D scan pipeline used by online clothing vendors, such requirements may not be economical, or otherwise may not be feasible.

Other advantages of the present disclosure are performance and simplicity. In terms of simplicity, a particular advantage is that processes of the present disclosure do not need any form of skeleton or rigging information to be associated with the body mesh as are required by similar methods. Such skeleton information about the body mesh typically needs to be generated manually by 3D artists, adding complexity, expense, and additional processing.

The present disclosure, by way of example only, will be described with reference to garments fitted on a human body, but it will be appreciated that the present disclosure is not necessarily so restricted and the novel approaches described herein may be more widely applicable. The meshes may represent any object fitted to another object.

Turning now to FIG. 1, a functional block diagram illustrating an example system 100 for deforming and/or layering meshes (referred to herein as system 100) is shown. System 100 may include input interface 110, deformation engine 120, layering engine 130, output interface 140 and data storage 190. In some examples, system 100 may include one or more of optional user interface 150, optional network interface 160, optional display 170 and optional rendering engine 180. In some examples, system 100 may include both deformation engine 120 and layering engine 130 (see FIG. 3A). In some examples, system 100 may include deformation engine 120 (see FIG. 3B). In some examples, system 100 may include layering engine 130 (see FIG. 3C). Although not shown, in some examples, system 100 may include a controller (e.g., a processor, a microcontroller, a circuit, software and/or other hardware component(s)) specially configured to control operation of input interface 110, deformation engine 120, layering engine 130, output interface 140, optional user interface 150, optional network interface 160, optional display 170, optional rendering engine 180 and data storage 190.

In some examples, input interface 110, deformation engine 120, layering engine 130, output interface 140 and data storage 190 (as well as optional user interface 150, optional network interface 160, optional display 170 and optional rendering engine 180) may be embodied on a single computing device. In other examples, input interface 110, deformation engine 120, layering engine 130, output interface 140 and data storage 190 (as well as optional user interface 150, optional network interface 160, optional display 170 and optional rendering engine 180) may refer to two or more computing devices distributed over several physical locations, connected by one or more wired and/or wireless links. It should be understood that system 100 refers to a computing system having sufficient processing and memory capabilities to perform the following specialized functions, and it does not necessarily refer to a specific physical location. An example computing system that may represent system 100 is described below with respect to FIG. 21.

Input interface 110 may represent any electronic device or application on an electronic device configured to receive one or more 3D polygonal garment meshes (i.e., 3D polygonal mesh(es) representing garment(s)) and one or more body meshes (i.e., 3D polygonal mesh(es) representing body(s) of various shapes). For purposes of the present disclosure, a garment mesh may be understood to mean a 3D representation of a garment. A garment mesh may include associated garment information such as, without being limited to, one or more of a garment identifier, texture information, manufacturer, designer, store information, material information, rendering options, sizing information, layering order and date. The garment meshes that are received represent a 3D polygonal mesh as fitted to a template body mesh. The sources of garment and body meshes may include any suitable source for capturing images, scanning materials, or any software that can be used to create the mesh. Sources may include, without being limited to, cameras, video recorders, 3D scanners, digital authoring tools for 3D artists, and publicly and/or privately accessible libraries of 3D meshes (e.g., Google 3D, TurboSquid, CGTrader). In some examples, equipment may be used to capture information data that may be transformed to meshes through software.

Deformation engine 120 may include mapping module 121, length adjustment module 122, and reconstruction module 123. Deformation engine 120 may be configured to receive at least one garment mesh, a template body mesh (i.e., the body mesh to which the garment mesh is fitted) and a target body mesh from input interface 110. In some examples, deformation engine 120 may be configured to generate a target body mesh from the template body mesh based on user-specified body measurements. Deformation engine 120 may be configured to deform a garment mesh to a target body mesh by a geometrical deformation algorithm, such that the deformed garment mesh represents a re-shaped garment that is fitted on the target body. Deformation engine 120 may be configured to provide one or more deformed garment meshes to output interface 140. In some examples, deformation engine 120 may be configured to provide two or more deformed garment meshes to layering engine 130.

Mapping module 121 may be configured to receive one or more garment meshes, a target body mesh and a template body mesh from input interface 110. Mapping module 121 may be configured to calculate mappings from each vertex of the garment mesh(s) to closest points on the template body mesh that are within a predetermined threshold of the vertex. Mapping module 121 may be configured to augment the mapping, by including other garment mesh vertices that are closest to the garment mesh vertex (e.g., within a predetermined threshold). Mapping module 121 may assign a weighting to each identified closest garment mesh vertex and each identified closest template body mesh vertex. Mapping module 121 may map the each garment mesh vertex by defining the garment mesh vertex as a weighted sum of the closets points on the template body mesh and the closest other garment mesh vertices. After the mapping to the template body mesh vertex is constructed, mapping module 121 may then determine the positions of the garment mesh vertices with respect to the target body mesh vertices, based on a predetermined mapping between the template and target body meshes. Mapping module 121 may then output the garment mesh having vertices mapped to the target body mesh. Mapping module 121 may repeat the mapping procedure for each received garment mesh.

Length adjustment module 122 may be configured to receive the mapped garment mesh(es), the template garment mesh and the target body mesh from mapping module 121, and perform a length adjustment process on the mapped garment mesh(es). The length adjustment process may be configured to adjust a length of the mapped garment mesh, such that the length of the mapped garment mesh may be scaled proportionally to the length of the target body mesh with respect to the length of the template body mesh. Length adjustment module 122 may be configured to apply a scaling transformation of the mapped garment mesh(es) to adjust the garment mesh length. Length adjustment module 122 may also apply a collision detection and response process to avoid intersections between the length-adjusted garment mesh and the target body mesh. Length adjustment module 122 may then output the length-adjusted garment mesh. Length adjustment module 122 may repeat the length adjustment and collision avoidance process for each received (mapped) garment mesh.

Reconstruction module 123 may be configured to receive the length-adjusted garment mesh(es) from length adjustment module 122, as well as the target body mesh and the original garment mesh(es) fitted to the template body mesh. Reconstruction module 123 may be configured to generate a reconstructed garment mesh(es) that resolves the final shape of the length-adjusted garment mesh to form the deformed garment mesh(es). To resolve the final shape, reconstruction module 123 may be configured to eliminate local defects in the garment mesh, such as self-intersections. In some examples, reconstruction module 123 may be configured to perform a Laplacian-based reconstruction process to induce the final positions of the garment mesh vertices (after mapping and length adjustment) with respect to the original shape of the garment mesh (i.e., the received garment mesh fitted to the template body mesh). Reconstruction module 123 may also apply a collision detection and response process to avoid intersections between the final reconstructed garment mesh and the target body mesh. Reconstruction module 123 may then output the deformed garment mesh. Reconstruction module 123 may repeat the reconstruction and collision avoidance process for each received (length-adjusted) garment mesh. In some examples, deformed garment mesh(es) may be stored in data storage 190.

In general, deformation engine 120 may receive a garment mesh from input interface 110, and process the garment mesh (via modules 121-123) such that the output garment mesh may be deformed with respect to the shape of the target body mesh (while retaining a same level of tightness), retains the overall length and geometric details of the input garment mesh, and may be free of self-intersections and intersections with the target body mesh. As discussed herein, deformation engine 120 may perform the deformation process without use of physical cloth simulation techniques. Instead, the processes performed by modules 121-123 represent a geometrical technique (i.e., a geometrical deformation algorithm) for simulating garment fitting on a target body. Deformation engine 120 is described further below with respect to FIG. 7.

Layering engine 130 may include collapse module 131, expand module 132 and shape-recover module 133. In some examples, layering engine 130 may be configured to receive two or more garment meshes and a target body mesh from input interface 110. In some examples, layering engine 130 may be configured to receive two or more deformed garment meshes from deformation engine 120. The received garment meshes (deformed garment meshes) may represent garments individually fitted to the target body mesh. Layering engine 130 may be configured to layer the garment meshes (deformed garment meshes) to the target body mesh according to a predetermined layering order, to generate a set of layered garment meshes collectively fitted to the target body mesh without intersections between the layered garment meshes. In some examples, the predetermined layering order may be a user-specified order received, for example, via user interface 150. In some examples, the predetermined layering order may be determined by layering engine 130. In some examples, the garment meshes may include information indicating a desired layering order. Layering engine 130 may be configured to provide a set of layered garment meshes to output interface 140.

Collapse module 131, expand module 132 and shape-recover module 133 may be configured to process the garment meshes in a sequential order associated with the predetermined layering order. The predetermined layering order may represent an arrangement of the garment meshes with respect to the target body mesh from a closest layer to the target body mesh to an outermost (i.e., farthest) layer to the target body mesh. Each of modules 131-133 may be configured to process inner garment meshes (all meshes in the assigned predetermined layering order except for the outermost garment mesh) with respect to the sequential order. In some examples, the sequential order (of the inner garment meshes) may include processing from a next outermost layer to the innermost layer.

Collapse module 131 may be configured to receive the target body mesh and the two or more garment meshes from, for example, input interface 110 and/or deformation engine 120. Collapse module 131 may also be configured to receive the predetermined layering order from, for example, input interface 110, user interface 150 and/or data storage 170. Collapse module 131 may be configured to collapse all inner garment meshes (all meshes in the assigned predetermined layering order except for the outermost garment mesh) onto the target body mesh. For each inner garment mesh, collapse module 131 may be configured to map vertices of the inner garment mesh to the closest location (i.e., within a predetermined threshold) on the target body mesh. Collapse module 131 may then output the current collapsed garment mesh (i.e., the current garment mesh being processed according to the inner mesh processing order sequence).

Expand module 132 may be configured to receive outer garment mesh(s) (i.e., garment meshes other than the current inner garment mesh that are farther from the current inner garment mesh according to the predetermined layering order). Expand module 132 may be configured to slightly expand (i.e., according to a predetermined amount) the outer garment mesh(s) along the respective normal directions. The expansion may be used to make room for the current inner mesh to be tucked inside the outer mesh(s). Expand module 132 may then output expanded outer garment mesh(s).

Shape-recover module 133 may be configured to receive the collapsed current garment mesh (from collapse module 131) and the expanded outer garment mesh(s) (from expand module 132), and recover the shape of the collapsed inner garment mesh toward its original shape. Shape-recover module 133 may be configured to induce the final positions of vertices of the collapsed garment mesh based on an original shape of the current garment mesh (before being collapsed). Shape-recover module 133 may be configured to perform the shape-recovery while simultaneously performing a collision detection and response process of the shape-recovered (current) garment mesh with respect to the expanded outer garment mesh(s). The collision detection/response process may be performed to avoid intersections between the reconstructed (current) inner garment mesh and the target body mesh, as well as between the reconstructed inner garment mesh and the expanded outer meshes. Shape-recover module 133 may then output a current shape-recovered garment mesh (i.e., the current garment mesh being processed according to the inner mesh processing order sequence).

Modules 131-133 may be configured to repeat the processing for each inner garment mesh to form a set of layered garment meshes. In some examples, collapsed garment meshes, expanded garment meshes, shape-recovered garment meshes and/or the received garment meshes may be stored in data storage 190, e.g., at least during the layering process performed by layering engine 130.

In general, layering engine 130 may receive two or more garment meshes, a target body mesh and a predetermined layering order, and process the garment meshes (via modules 131-133), such that inner garment meshes are iteratively deformed one garment mesh at a time, starting from the second outermost layer to the innermost layer. At each iteration, the garment mesh being deformed may be slightly shrunk to resolve intersections with the outer garment mesh(s). Layering engine 130 is described further below with respect to FIG. 16.

Output interface 140 may represent any electronic device, or application on an electronic device, configured to output one or more 3D polygonal garment meshes (i.e., 3D polygonal mesh(es) representing garment(s)) and one or more body meshes (i.e., 3D polygonal mesh(es) representing body(s) of various shapes). The garment meshes that are output may be deformed and/or layered garment mesh(s) that represent at least one 3D polygonal mesh as fitted to a target body mesh. The destination of the deformed, layered garment mesh(s) may include, without being limited to, rendering engines (such as rendering engine 180), displays (such as display 170), data storage (such as data storage 190), video recorders, 3D printers, digital authoring tools for 3D artists, and/or publicly or privately accessible libraries of 3D meshes.

Data storage 190 may be any device or combination of devices suitable for storing polygonal meshes (e.g., target body mesh(s), template body mesh(s), input garment mesh(s), deformed garment mesh(s), a set of layered garment meshes), a predetermined layering order, data or instructions (e.g., software) for performing any one or more of the functions described herein. Data storage 190 may include any suitable non-transitory computer-readable storage medium, including, without being limited to, solid-state memories, optical media and magnetic media, or a combination thereof.

Optional user interface 150 may be any device or combination of devices suitable for a user to provide data or information to system 100 (e.g., a layering order, selection of deformation and/or layering, input of parameters for controlling deformation and/or layering processing, display preferences, rendering preferences, etc.). Optional user interface 150 may include, without being limited to, a physical keyboard, a virtual keyboard, a camera, a smartphone, a tablet device, a touch screen, a computer mouse, a speaker, a camera, a microphone, an alphanumeric input device, a cursor control device, or any combination thereof. In some examples, optional user interface 150 may be combined with other components of system 100, such as display 170.

Optional display 170 may be any device or combination of devices suitable for displaying 3D polygonal meshes, including deformed and/or layered garment meshes with respect to a target body mesh. Optional display 170 may include, without being limited to, touch sensitive displays, cathode ray tube displays, light-emitting diode displays, electroluminescent display, plasma display panels, liquid crystal displays, organic light-emitting diode displays, etc.

Optional network interface 160 may be any device or combination of devices suitable for providing electronic communication for components system 100 using a wired connection (e.g., Ethernet) and/or a wireless connection (e.g., WiFi). As an example and not by way of limitation, optional network interface 160 may include a network interface card (NIC) (also known as a network interface controller), network adapter, local area network (LAN) adapter, a wireless NIC (WNIC) or a combination thereof. Optional network interface 160 may communicate with an ad hoc network, a personal area network (PAN), a local area network (LAN), a WAN, a metropolitan area network (MAN), or one or more portions of the Internet or any combination thereof.

Optional rendering engine 180 may be any device or combination of devices, or application on an electronic device, suitable for producing rendered frames of the deformed and/or layered garment meshes and target body mesh for offline or real-time viewing. In some examples, optional rendering engine 180 may receive modified (deformed and/or layered) garment meshes along with other data (such as avatar model, background scenes, accessories, etc.) for producing rendered frames. Optional rendering engine 180 may include, but is not limited to, a dedicated graphics card (also called discrete), a general purpose graphics processing unit (GPGPU), a graphics processor (GPU) located remotely to system 100, or a combination thereof. Software used for rendering may employ any number of different techniques to obtain a final image, including but not limited to, tracing, rasterization (including scanline rendering), ray casting, ray tracing, radiosity, or a combination thereof.

System 100 may include any suitable hardware and/or software components for performing the functions described herein.

Some portions of the description herein describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, should be understood to be implemented by computer programs or equivalent electrical circuits, microcode, or the like. Furthermore, it has also proven convenient at times, to refer to these arrangements of operations as modules, without loss of generality. The described operations and their associated modules may be embodied in specialized software, firmware, specially-configured hardware or any combinations thereof.

Those skilled in the art will appreciate that system 100 may be configured with more or less modules to conduct the methods described herein with reference to FIGS. 2, 3A-3C, 7 and 16. As illustrated in FIGS. 2, 3A-3C, 7 and 16, the methods shown may be performed by processing logic (e.g., such as processing logic 2104 in FIG. 21) that may include hardware (e.g., circuitry, dedicated logic, programmable logic, microcode, etc.), software (such as instructions run on a processing device), or a combination thereof. In one embodiment, the methods shown in FIGS. 2, 3A-3C, 7 and 16 may be performed by one or more specialized processing components associated with components 120 and 130 of system 100.

Figure 2:
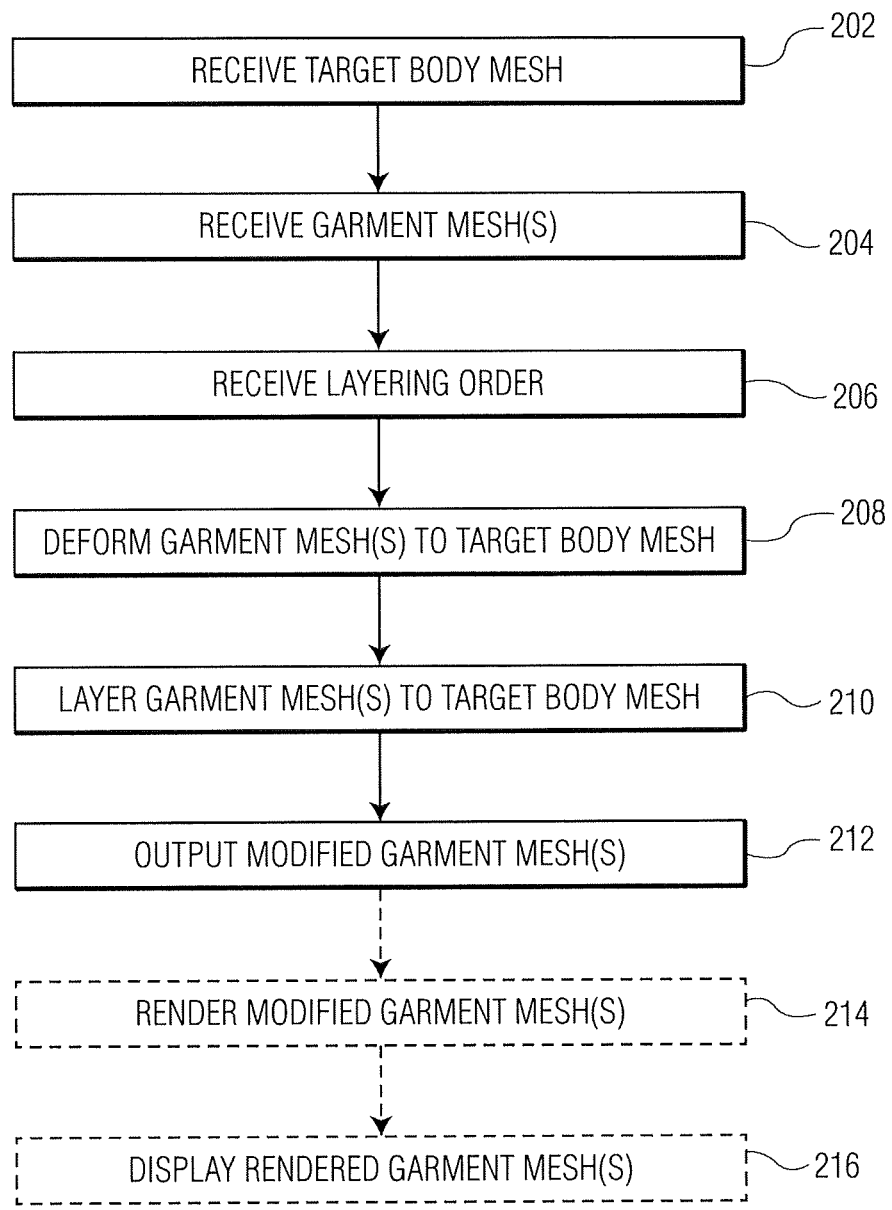
FIG. 2 is a flowchart diagram of an example method for garment mesh deformation and/or garment mesh layering associated with the system shown in FIG. 1, according to an aspect of the present disclosure.

FIG. 2 is a flowchart diagram of an example method for garment mesh deformation and/or garment mesh layering, associated with system 100 (FIG. 1). In FIG. 2, it is understood that some of the steps may be performed by system 100 concurrently with other steps or a combination of steps, may be performed in a different sequence than shown or that some of the steps may be omitted (depending upon whether system 100 performs deformation and/or layering).

At Step 202, a target body mesh may be received, for example by input interface 110. In some examples, at Step 202, a template body mesh may also be received by input interface 110. For example, a template body mesh may be received when at least one garment mesh is to be deformed from a template body mesh to the target body mesh. At Step 204, at least one garment mesh may be received by input interface 110. In some examples, a single garment mesh may be received for deformation by deformation engine 120. In some examples two or more garment meshes may be received for layering by layering engine 130. In some examples, two or more garment meshes may be received for both deformation (by deformation engine 120) and layering (by layering engine 130). In some examples, at Step 206, a layering order may be received, for example, by optional user interface 150. In some examples, a layering order may be obtained via retrieval from data storage 190. In some examples, system 100 may receive (via input interface 110 and/or optional user interface 150) an indication of deformation and/or layering associated with the received garment mesh(s).

At Step 208, the received garment mesh(s) may be deformed to the received target body mesh by deformation engine 120. For example, Steps 202 and 204 may proceed to Step 208 when an indication is received to deform the garment mesh(s) to the target body mesh. Deformation engine 120 may deform the garment mesh(s) that are fitted to the template body mesh, using a geometrical deformation algorithm, such that the deformed garment mesh(s) is fitted to the target body mesh. Step 208 is described further below with respect to FIG. 7. In some examples, Step 208 may proceed to Step 210. In some examples, Step 210 may be omitted, and Step 208 may proceed to Step 212 (where the deformed garment mesh(s) may form the modified garment mesh(s)).

Figures 5A, 5B, 5C:
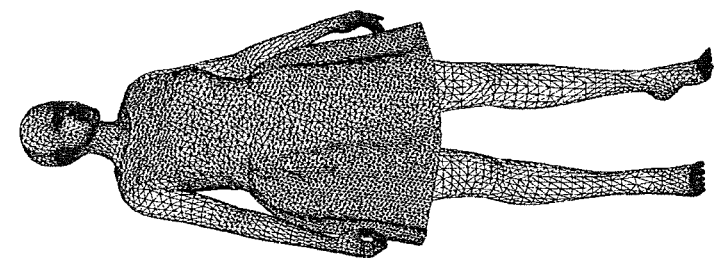
FIGS. 5A, 5B 5C, 5D, 5E and 5F illustrate various 3D polygonal meshes associated with an example garment deformation process, according to an aspect of the present disclosure.

For example, FIGS. 5A-5F illustrate an example deformation process performed by deformation engine 120, for deformation of a garment mesh onto a target body mesh. FIG. 5A illustrates a template body mesh of the type that may be received at input interface 110. FIG. 5B illustrates an original garment mesh of the type that may be received at input interface 110. In FIG. 5B, the garment mesh is fitted to the template body mesh shown in FIG. 5A. FIG. 5C illustrates the combination of the original garment mesh of FIG. 5B and the template body mesh of FIG. 5A.

Figures 5D, 5E, 5F:
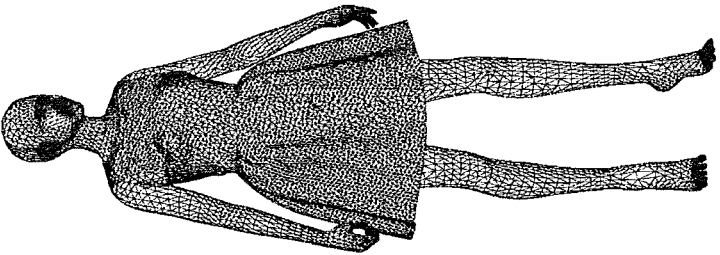

FIG. 5D illustrates a target body mesh that is different from the template body mesh of FIG. 5A (e.g., having a different shape which may be associated with a different size and/or pose). FIG. 5E illustrates the original garment mesh of FIG. 5B deformed to fit the target body mesh shown in FIG. 5D according to the deformation process of deformation engine 120. FIG. 5F illustrates the deformed garment mesh of FIG. 5E combined with the target body mesh of FIG. 5D.

At Step 210, two or more received garment meshes may be layered to the target body mesh by layering engine 130. In some examples, Steps 202-206 may proceed to Step 210 (while omitting Step 208) when an indication is received to layer the garment meshes to the target body mesh. In some examples, Steps 202-208 may proceed to Step 210 when an indication is received to deform the garment meshes to a target body mesh and to layer the (deformed) garment meshes to the target body mesh. Layering engine 130 may layer the garment meshes to the target body meshes according to the layering order (Step 206) to form a set of layered garment meshes that are free of intersections. Step 210 is described further below with respect to FIG. 16. In some examples, Step 210 may proceed to Step 212.

FIGS. 6A-6H illustrate an aspect of the present disclosure relating to layering garment meshes onto a target body mesh. FIG. 6E illustrates a comparative example of the target body mesh of FIG. 6A layered with the garment meshes of FIGS. 6B-6D (individually fitted onto the target body mesh), without performing the layering process of layering engine 130. Inset FIG. 6F shows that severe intersections may occur between the meshes. FIG. 6G illustrates the layering of the same garment meshes of FIGS. 6B-6D onto the target body mesh of FIG. 6A according to the layering process of layering engine 130. Inset FIG. 6H shows that the layering process generates intersection-free layering of the same garment meshes as compared to FIG. 6F.

At Step 212, modified garment mesh(s) may be outputted to output interface 140. In some examples, deformed garment mesh(s) generated at Step 208 (while omitting Step 210) may represent the modified garment mesh(s). In some examples, a set of layered garment meshes generated at Step 210 (while omitting Step 208) may represent the modified garment meshes. In some examples, a set of layered and deformed garment meshes generated by the combination of Steps 208 and 210 may represent the modified garment meshes.

In some examples, the modified garment mesh(s) may be rendered in optional Step 214, for example, by optional rendering engine 180. In some examples, at optional Step 216, the output modified (or optionally rendered) garment mesh(s) may be displayed, for example, via optional display 170.

Figure 3A:
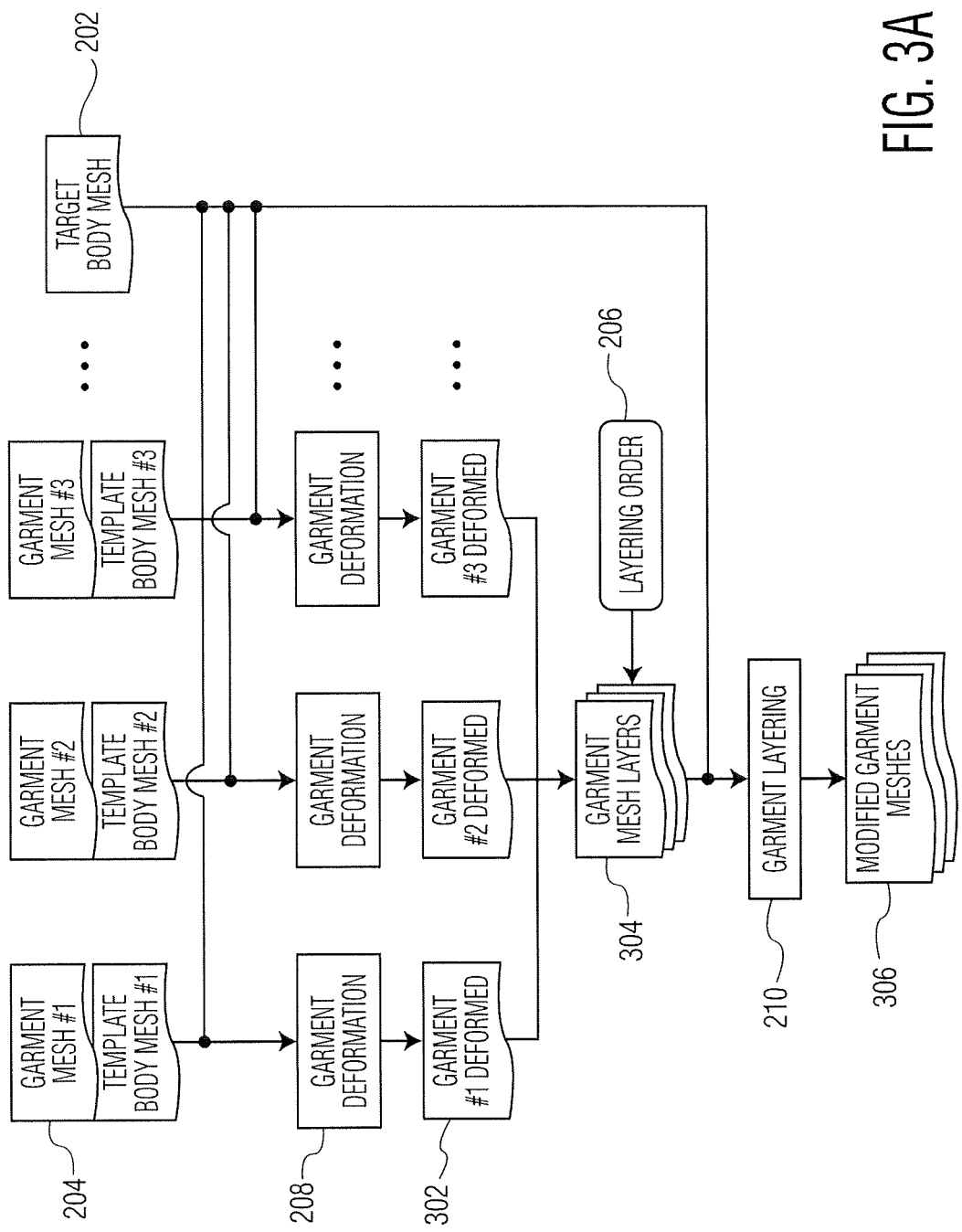
FIG. 3A is a flowchart diagram of an example method of a garment deformation and layering process associated with the system shown in FIG. 1, according to an aspect of the present disclosure.

Turning to FIG. 3A, the flowchart illustrates another example of the present disclosure including both garment deformation and garment layering processes (via both deformation engine 120 and layering engine 130). A goal of the example process may be to deform a set of garment meshes (received in Step 204) that are fitted to one or more template body meshes to a target body mesh (received in Step 202) (i.e., such that the deformed garment meshes are fitted to the target body mesh) and layered on the target body mesh in an assigned layering order (received in Step 206).

In some examples, the assigned layering order may be a user-specified layering order 206. In some examples, the layering order may be predetermined by a vendor or determined by data associated with the garment meshes. In some examples using a user-specified layering order, the layering order may be completely decided by the user. For example, given garment meshes representing a shirt, a pant, and a jacket. A shirt-pant-jacket order may mean that the shirt is tucked inside the pant, and the jacket is worn outside of both the shirt and the pant.

The process in FIG. 3A may use the target body mesh (received at Step 202) and the set of garment meshes (received at Step 204) fitted to their respective template body meshes, and first deform the set of garment meshes at Step 208 (by deformation engine 120), to form a set of deformed garment meshes 302. Each deformed garment mesh 302 may be deformed such that the respective garment mesh is (separately) fitted to the target body mesh. At Step 304, a layering order (received in Step 206) may be assigned to the set of deformed garment meshes 302, to form garment mesh layers. At Step 210, a layering process may then be performed by layering engine 130 on the assigned deformed garment mesh layers, to form a set of deformed and layered (i.e., modified) garment meshes 306. Accordingly, the set of modified garment meshes 306 may be deformed to a state as if they are worn on the target body mesh and layered in an assigned layering order.

Figure 3B:
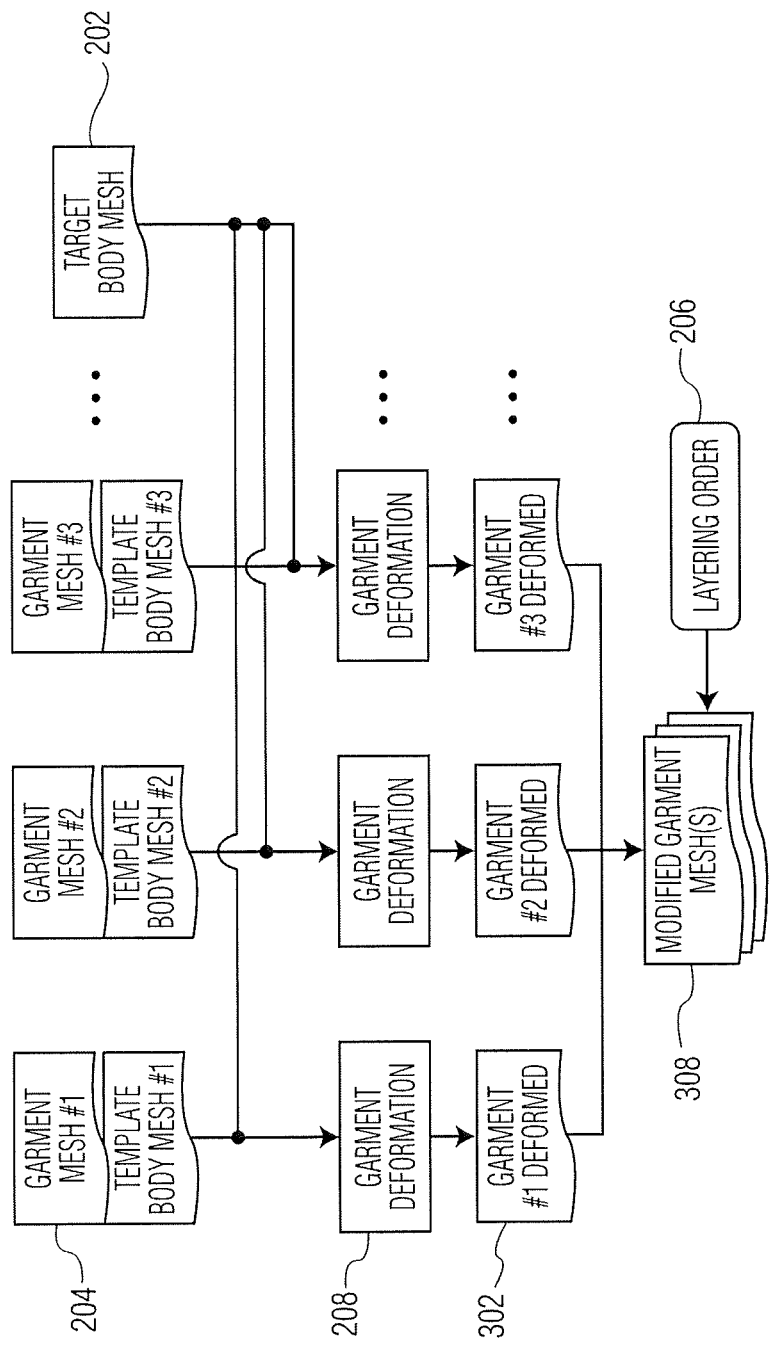
FIG. 3B is a flowchart diagram of an example method of garment mesh deformation associated with the system shown in FIG. 1, according to another aspect of the present disclosure.

FIG. 3B is a flowchart illustrating an example of the present disclosure including garment deformation by deformation engine 120 (e.g., without layering by layering engine 130). The process may use a target body mesh (received at Step 202) and one or more garment meshes (received in Step 204) fitted to one or more respective template body meshes. At Step 208, deformation engine 120 may perform a deformation process on each garment mesh to form one or more respective deformed garment meshes 302. Each deformed garment mesh 302 may be deformed such that the respective garment mesh is (separately) fitted to the target body mesh. In some examples, at Step 308, a layering order (received in Step 206) may be assigned to the set of deformed garment meshes 302, to form deformed (i.e., modified) garment mesh(s) with assigned layering order. Accordingly, the modified garment meshes 308 may be deformed to a state as if they are worn on the target body mesh with an assigned layering order.

Figure 3C:
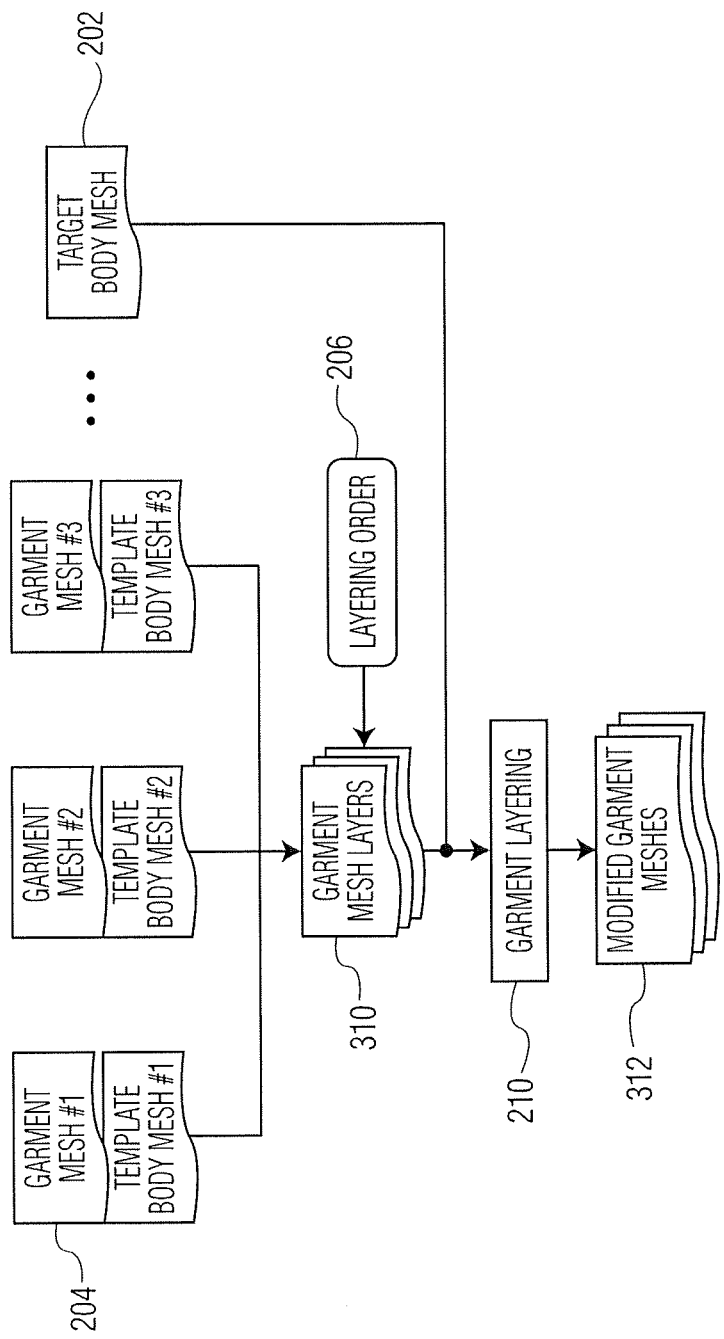
FIG. 3C is a flowchart diagram of an example method of garment mesh layering associated with the system shown in FIG. 1, according to another aspect of the present disclosure.

FIG. 3C is a flowchart illustrating an example of the present disclosure including garment layering by layering engine 130 (e.g., without deformation by deformation engine 120). The process may use a target body mesh (received at Step 202) and a set of garment meshes (received at Step 204) that are fitted to their respective template body meshes. In some examples, the target body mesh may be the same as the template body mesh(s). At Step 310, a layering order (received in Step 206) may be assigned to the set of garment meshes by layering engine 130 to form a set of garment mesh layers. At Step 210, layering engine 130 may perform a layering process on the garment mesh layers, and then output a set of layered (i.e., modified) garment meshes 312.

Figure 4A:
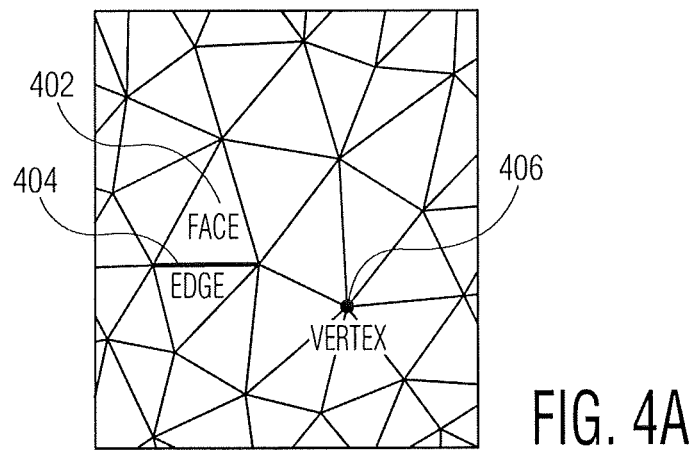
FIGS. 4A, 4B and 4C illustrate various aspects of 3D polygonal meshes.
Figure 4B:
Figure 4C:
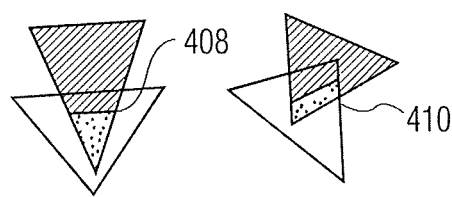

FIGS. 4A, 4B and 4C illustrate various aspects of three-dimensional polygonal meshes which may be useful for the understanding the description herein. Inputs to system 100 may include one or more polygonal meshes representing the shape of a garment, (hereinafter, garment mesh), one or more polygonal meshes representing the shape of a body (hereinafter, body mesh). As shown in FIG. 4A, a polygonal mesh refers to a collection of vertices 406, edges 404, and faces 402 that together approximate a three-dimensional shape (e.g., the garment mesh as shown in FIG. 4B). The method assumes that the garment mesh (FIG. 4B) is in a geometric shape as if it is worn on a body. The shape may be induced from a prior cloth simulation, a 3D scan from real-world sources, created by 3D artists, or by any related methods. The shape of the body mesh may be determined from a 3D scan of a physical body or may be directly created by 3D artists. The body may be a real human body or an artificial mannequin. Furthermore, the processes described herein assumes that garment meshes and body meshes (both template and target body meshes) have no self-intersections and no intersections between garment and body meshes. Herein, intersection is understood by its normal meaning in graphical processing for any distortion, stretching or disappearing of meshes. A particular example of intersection is illustrated in FIG. 4C wherein if two faces of a mesh intersect, then either two edges of one face intersect the other 408 or one edge of each face intersects the other 410.

In general, the meshes may be manifold polygonal triangle meshes in any suitable format, such as a standard data format (for example, Wavefront obj from Wavefront Technologies, a division of Autodesk). Non-triangle meshes may be converted into triangle meshes by any known means, and non-manifold meshes may be converted into manifold meshes by any known means. In some examples, when an received mesh is identified as being of poor quality (by a suitable quality metric), it may be remeshed by any known method.

Figure 7:
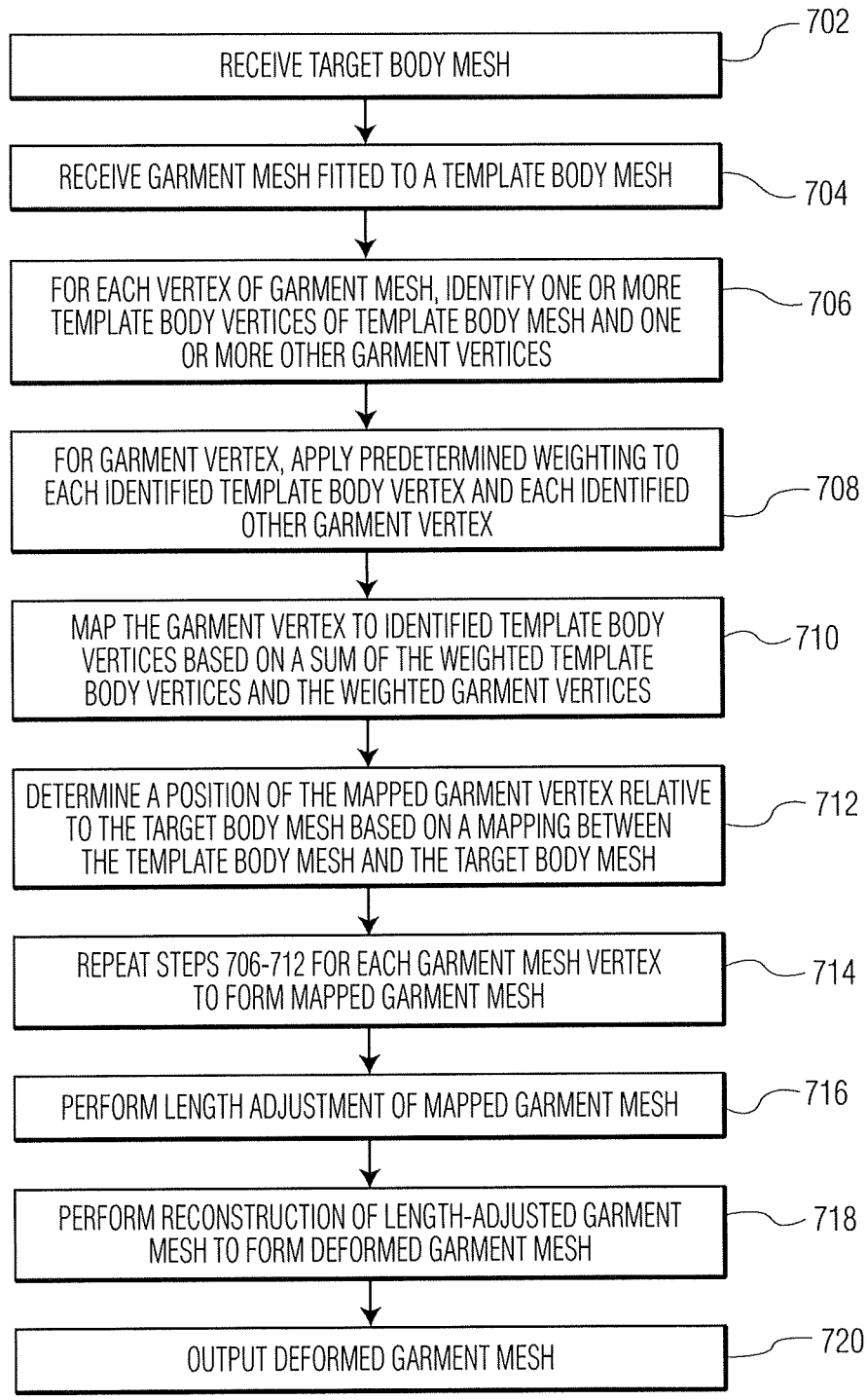
FIG. 7 is a flowchart diagram of an example method of garment deformation associated with the system shown in FIG. 1, according to an aspect of the present disclosure.

FIG. 7 is a flowchart diagram of an example method of a garment deformation process associated with system 100 (FIG. 1), according to an aspect of the present disclosure. In FIG. 7, it is understood that some of the steps may be performed by system 100 concurrently with other steps or a combination of steps, or may be performed in a different sequence than shown. The steps in FIG. 7 may be performed by deformation engine 120. Although deformation of one garment mesh is described below, it is understood that the same process may be performed on two or more garment meshes fitted to one or more different template body meshes that are to be deformed to a target body mesh.

At Step 702, a target body mesh may be received via input interface 110. At Step 704, a template body mesh and a garment mesh fitted to the template body mesh may be received via user interface 110. The target body mesh, template body mesh and garment mesh may be provided to mapping module 121 of deformation engine 120.

Next, at Steps 706-714, mapping module may map each vertex of the garment mesh to the target body mesh. In general, the mapping of the garment mesh vertices to the target body mesh forms a mapped garment mesh. The mapped garment mesh is deformed from the original (received) garment mesh to be fitted to the target body mesh. The deformation process also includes additional length adjustment and reconstruction steps (Steps 716-718). For clarity, the deformation generated by the mapping steps (Steps 706-714) is referred to herein as a mapped garment mesh.

In particular, at Step 706, for each vertex of the garment mesh (e.g., vertex $V_i$), mapping module 121 may identify one or more template body vertices of the template body mesh, and one or more other garment vertices of the garment mesh that are within a predetermined threshold (described further below) from the garment mesh vertex (e.g., $V_i$). At Step 708, mapping module 121 may apply a predetermined weighting to each identified template body vertex and each identified other garment vertex (described further below).

At Step 710, mapping module 121 may map the garment vertex ($V_i$) to the identified template body vertices based on a sum of the weighted template body vertices and the weighted garment vertices. At Step 712, mapping module 121 may determine a position of the mapped garment vertex relative to the target body mesh, based on a mapping between the template body mesh and the target body mesh. At Step 714, mapping module 121 may repeat Steps 706-712 for each vertex of the garment mesh to form a mapped garment mesh. Mapping Steps 706-714 are described in detail further below.

At Step 716, length adjustment module 121 may adjust a length of the mapped garment mesh, in order to scale the mapped garment mesh with respect to the original length of the (original) garment mesh while also avoiding any intersections between the length-adjusted garment mesh and the target body mesh. Length adjustment (Step 716) is discussed in detail below with respect to FIGS. 15A-15C.

At Step 718, reconstruction module 123 may perform reconstruction of the length-adjusted (and mapped) garment mesh, to form the deformed garment mesh. The reconstruction process may include resolving any local defects such as self-intersections, to induce the final positions of the garment mesh vertices, while avoiding intersections between the final (deformed) garment mesh and the target body mesh. Step 718 is discussed in detail further below. At Step 720, the deformed garment mesh generated by deformation engine 120 may be output, for example, via output interface 140. In some examples, Steps 702-720 may be repeated for two or more garment meshes. In some examples, two or more deformed garment meshes (output at Step 720) may be provided to layering engine 130, to perform the layering process described in FIG. 16 below.

Figure 8:
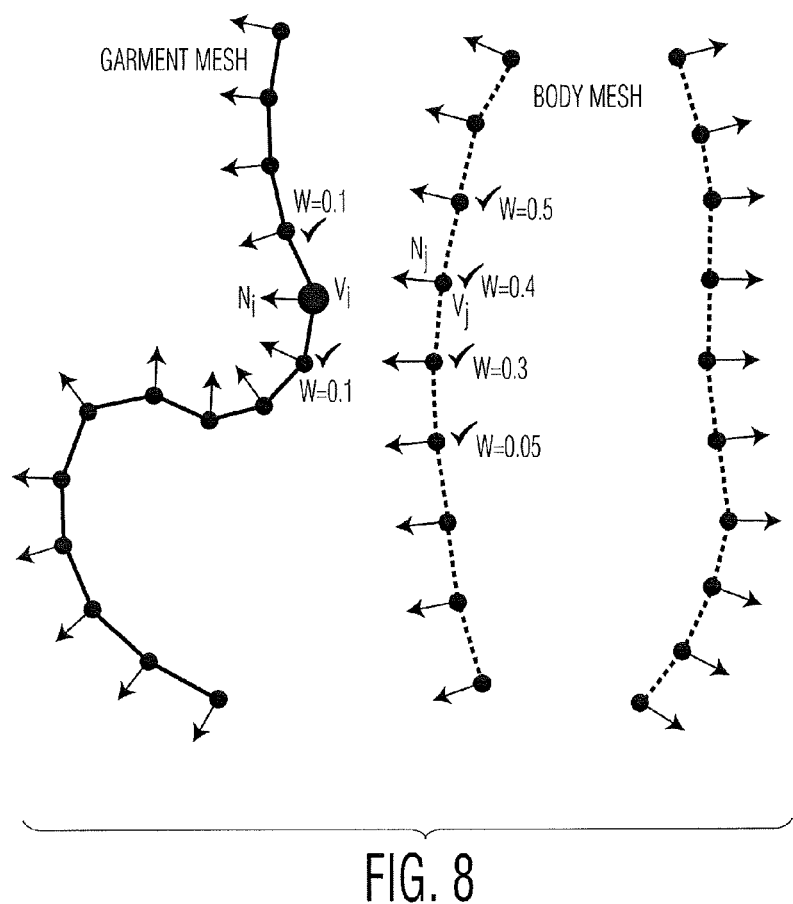
FIG. 8 is a two-dimensional illustration of mapping of a 3D garment mesh vertex with respect to 3D body mesh vertices, according to an aspect of the present disclosure.

The deformation process (performed by deformation engine 120) may include determining mappings (by mapping module 121) from each of the vertices of a garment mesh to closest points (i.e., within a predetermined threshold) on a template body mesh, based on a sum of the weighted template body vertices and the weighted garment vertices (Steps 706-710), as illustrated in FIG. 8. For clarity, the present disclosure uses 2D illustrations of the meshes, as 3D illustrations may appear to be cluttered. For additional clarity, the present disclosure uses dotted lines to represent a portion of a body mesh (i.e., a template or target body mesh), and solid lines to represent a portion of a garment mesh.

The mapping (in Steps 706-710) may be augmented by including the closest vertices on the garment mesh along with the closest vertices on the template body mesh. Augmented weighting (Step 710) is hereby understood to mean weighting that includes both nearby template body vertices and nearby garment vertices (as discussed below). Non-augmented weighting is hereby understood to mean weighting that only includes nearby template body vertices.

Figure 9:
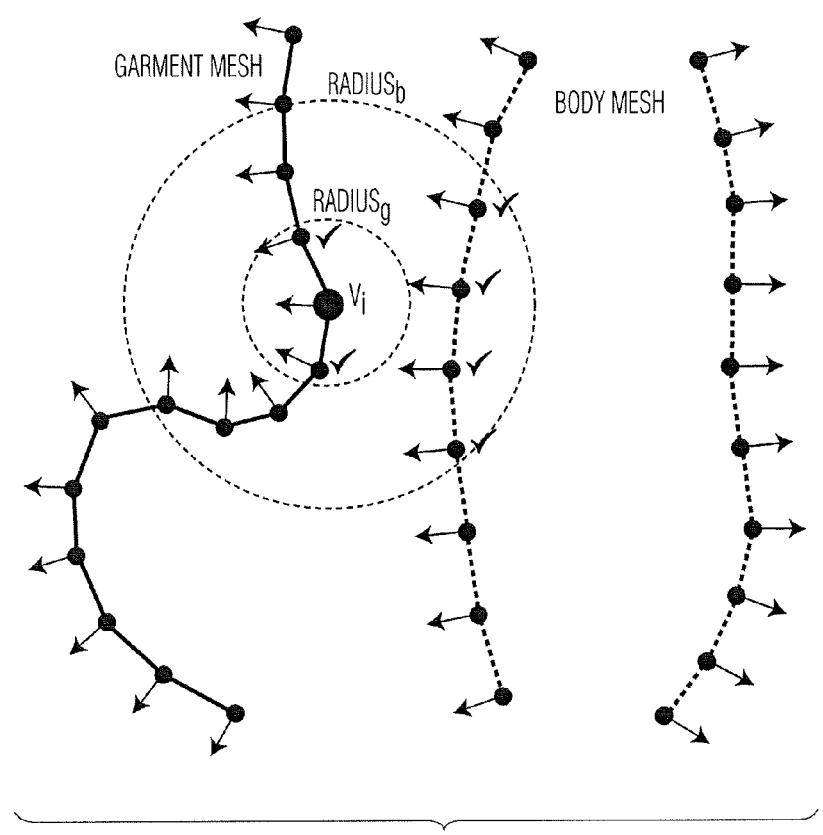
FIG. 9 is a two-dimensional illustration of mapping of a 3D garment vertex with respect to 3D body mesh vertices, using a predetermined distance range in connection with an aspect of the present disclosure.
Figure 10:
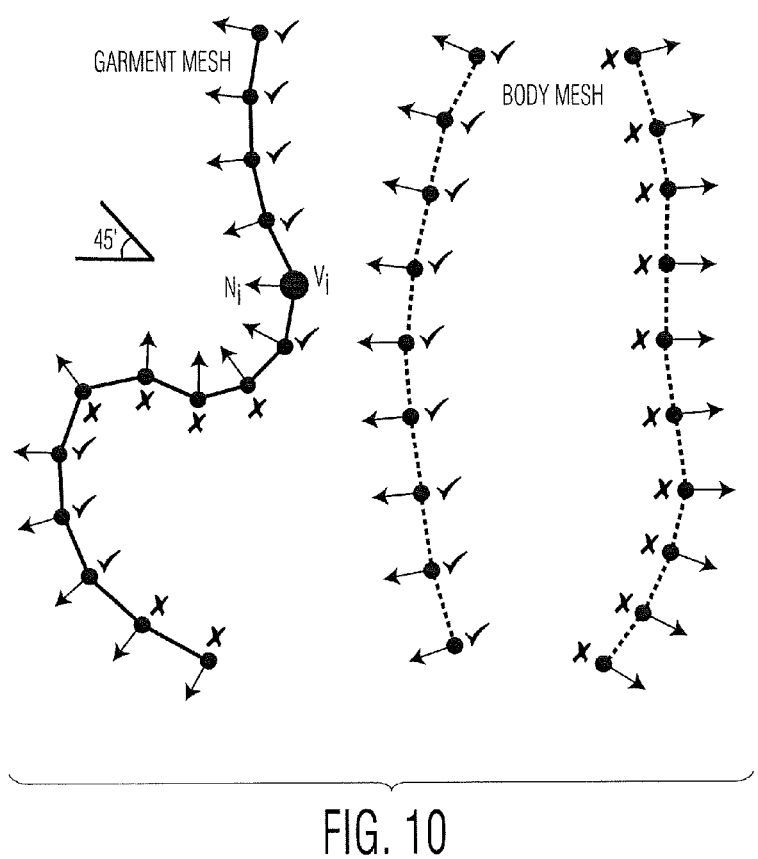
FIG. 10 is a two-dimensional illustration of mapping of a 3D garment vertex with respect to 3D body mesh vertices, using a predetermined angle range in connection with an aspect of the present disclosure.
Figure 11:
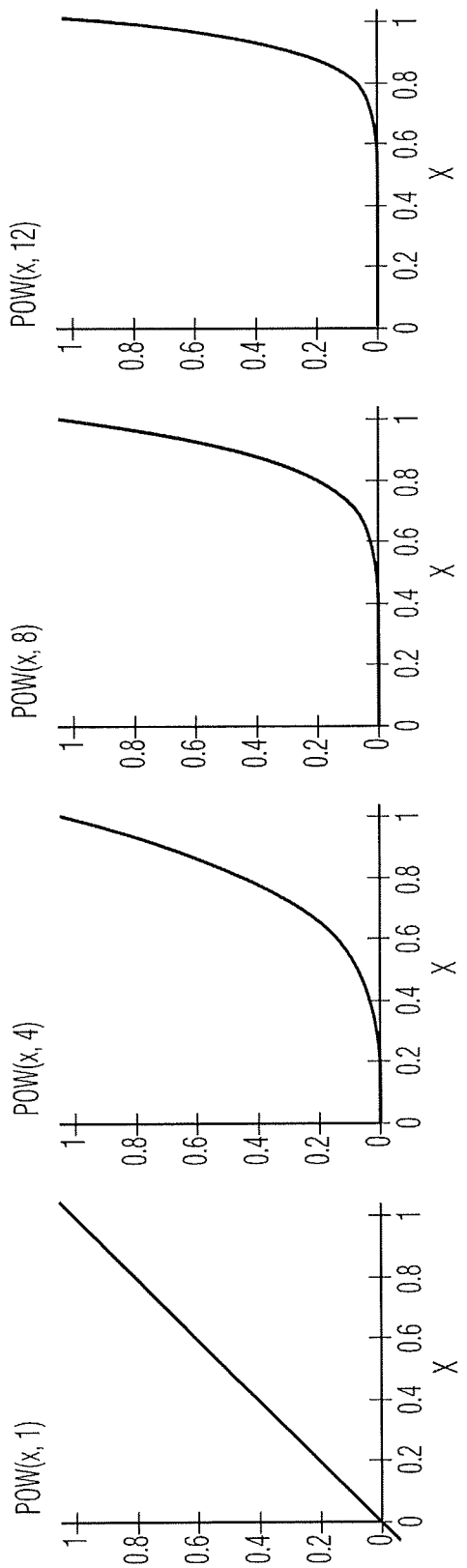
FIGS. 11A, 11B, 11C and 11D are illustrations of various power functions, which may be used in connection with an aspect of the present disclosure.

The identification of vertices (Step 706) may include identifying template body and other garment mesh vertices within a distance threshold, as illustrated by the radii in FIG. 9, an angle threshold measuring the alignment of the surface normals ($N_i$) on the vertex ($V_i$) and the points (at any place on the faces or along the edges), as illustrated in FIG. 10, or both. A weighting (Step 710) may be applied to the set of points inversely proportional to the distances between the vertex ($V_i$) and the points by a power function, that is, the closest point may be assigned to the largest weighting, and so on. Examples of power functions are illustrated in FIGS. 11A-11D. The sum of the weighting may be set to unity (i.e., one).

As illustrated in FIG. 9, two different distance thresholds may be used by mapping module 121 for identifying nearby template body and garment vertices (Step 706) to a vertex's mapping (Radius$_g$ and Radius$_b$, respectively). In some examples, the threshold may be larger for template body vertices than for nearby (i.e., other) garment vertices. In a non-limiting example as illustrated in FIG. 9, four template body vertices may be included in the mapping of vertex $V_1$, and two other garment vertices may be included. The identified template body and garment mesh vertices are noted with checkmarks in FIG. 9.

In FIG. 10, an angle threshold of 45 degrees is illustrated. A nearby template body or garment vertex may not be included in the mapping of a garment mesh vertex if the surface normals deviate by more than the angle threshold. In FIG. 10, template body and (other) garment mesh vertices that meet the angle threshold (i.e., are within or equal to the angle threshold) are noted with checkmarks. Template body and garment mesh vertices that fail the angle threshold (i.e., that are outside of the angle threshold) are noted with crossmarks. In some examples, both distance and angle thresholds may be met for a nearby template body mesh vertex and garment mesh vertex to be included into the mapping of vertex V; by mapping module 121.

$$V^g_i = (\Sigma W^b_{i,j} V^b_j + \Sigma W^g_{i,j} V^g_j) L_i, \quad [1]$$

$$L_i = V^g_i - (\Sigma W^b_{i,j} V^b_j + \Sigma W^g_{i,j} V^g_j) \quad [2]$$

$$W^b_{i,j} = \text{pow}((\text{dist}^b_{max} - \|v_i - v_j\|)/(\text{dist}^b_{max} - \text{dist}^b_{min}), k^b_d) * \text{pow}((N_i^\circ N_j - \text{dot}^b_{min})/(\text{dot}^b_{max} - \text{dot}^b_{min}), k^b_n) \quad [3]$$

$$W^g_{i,j} = \text{pow}((\text{dist}^g_{max} - \|v_i - v_j\|)/(\text{dist}^g_{max} - \text{dist}^g_{min}), k^g_d) * \text{pow}((N_i^\circ N_j - \text{dot}^g_{min})/(\text{dot}^g_{max} - \text{dot}^g_{min}), k^g_n) \quad [4]$$

$$\Sigma W^b_{i,j} + \Sigma W^g_{i,j} = 1 \quad [5]$$

$$\Sigma W^b_{i,j} = W^b_{sum} \quad [6]$$

$$\Sigma W^g_{i,j} = W^g_{sum} \quad [7]$$

$$Vx_0 = (\Sigma W^b_{0,j} Vx^b_{0,j} + \Sigma W^g_{0,j} Vx^g_{0,j}) + Lx_0$$

$$Vx_1 = (\Sigma W^b_{1,j} Vx^b_{1,j} + \Sigma W^g_{1,j} Vx^g_{1,j}) + Lx_1$$

$$\ldots$$

$$Vx_{n-1} = (\Sigma W^b_{n-1,j} Vx^b_{n-1,j} + \Sigma W^g_{n-1,j} Vx^g_{n-1,j}) + Lx_{n-1} \quad [8]$$

$$Vy_0 = (\Sigma W^b_{0,j} Vy^b_{0,j} + \Sigma W^g_{0,j} Vy^g_{0,j}) + Ly_0$$

$$Vy_1 = (\Sigma W^b_{1,j} Vy^b_{1,j} + \Sigma W^g_{1,j} Vy^g_{1,j}) + Ly_1$$

$$\ldots$$

$$Vy_{n-1} = (\Sigma W^b_{n-1,j} Vy^b_{n-1,j} + \Sigma W^g_{n-1,j} Vy^g_{n-1,j}) + Ly_{n-1} \quad [9]$$

$$Vz_0 = (\Sigma W^b_{0,j} Vz^b_{0,j} + \Sigma W^g_{0,j} Vz^g_{0,j}) + Lz_0$$

$$Vz_1 = (\Sigma W^b_{1,j} Vz^b_{1,j} + \Sigma W^g_{1,j} Vz^g_{1,j}) + Lz_1$$

$$\ldots$$

$$Vz_{n-1} = (\Sigma W^b_{n-1,j} Vz^b_{n-1,j} + \Sigma W^g_{n-1,j} Vz^g_{1,j}) + Lz_{n-1} \quad [10]$$

Figure 12:
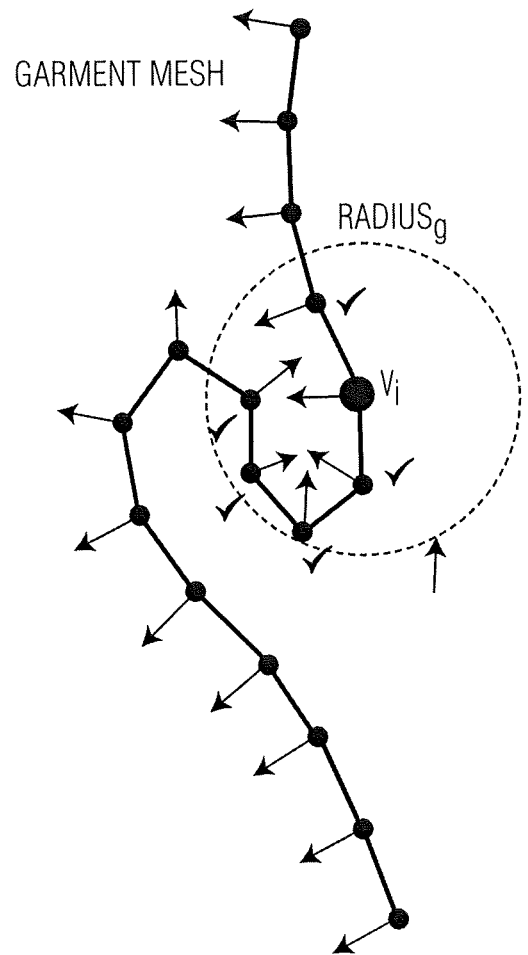
FIG. 12 is a two-dimensional illustration of a self-intersection of a 3D garment mesh.

Equation [1] refers to the mapping of nearby template body vertices by mapping module 121 (Steps 706-712). Nearby template body vertices may be given a higher preference than nearby garment vertices to mainly define the garment mesh by the offsets from nearby template body meshes. Therefore, after the template body mesh is deformed to its new shape (as the target body mesh), the garment mesh may also deform to a new shape that is intersection-free with the target body mesh. However, nearby garment mesh vertices themselves may be included (i.e., as an augmented weighting) to prevent the reconstructed garment mesh from becoming self-intersecting. FIG. 12 illustrates one such possible case, where the garment mesh includes a wrinkle-like garment detail near vertex $V_i$. This fine detail, (i.e., the wrinkle) may be formed by some garment vertices that are very close to each other. The wrinkle is likely to become self-intersecting (or, "collapse") when only a non-augmented weighting scheme is applied.

Equations [1] and [2] illustrate the concept of the weighted mapping scheme. Each vertex, $V_i$, may be a weighted average of its adjacent body vertices (i.e., $V^b_j$) and garment vertices (i.e., $V^g_j$) plus a Laplacian vector, $L_i$. The Laplacian vectors may be pre-calculated by Equation [2] using the vertex positions of the template body mesh and garment vertices. Equation [1], for all vertices together, form three linear Laplacian systems (one for each dimension) that can be solved in a least-square sense by well-known closed-form solutions (e.g., QR decompositions). The three linear Laplacian systems are discussed in detail below in respect to Equations [8], [9] and [10]. The Laplacian vectors are constants (pre-calculated by Equation [2]). The vertices of the target body vertices may be entered into the system of Equation [1] and the positions for the garment vertices may be solved.

Equations [3] and [4] illustrate how mapping module 121 may calculate weightings (Step 710) for the nearby vertices to vertex $V_i$. In some examples, the weighting equation may apply the highest weight to the nearby vertex that is closest to $V_i$ and with the surface normal mostly aligned, and vice versa. Equations [3] and [4] are two different weighting equations for nearby template body vertices (Equation [3]) and nearby garment mesh vertices (Equation [4]).

Referring to Equations [3] and [4], "pow" is the power function (i.e., pow(x, d)=$x^d$) wherein dist$^b_{min}$ and dist$^b_{max}$ denote, respectively, the smallest and largest distances from $V_i$ to nearby template body vertices within the distance threshold (i.e., Radius$_b$ in FIG. 9). Likewise, dist$^g_{min}$ and dist$^g_{max}$ denote, respectively, the smallest and largest distances from $V_i$ to nearby garment vertices within the distance threshold (i.e., Radius$_g$ in FIG. 9). The power function may be used to map the distances to weighting values within the range of zero to one, and in a reverse (i.e., the smaller the distance, the greater the weighting) and steeper-than-linear manner, as illustrated in FIGS. 11A-11D. In some examples, a power function of degree 8 may be used. The same weighting functions may be applied to the surface normal deviations by replacing the distance values by the dot products of the surface normals.

Equations [5], [6] and [7] illustrate normalization of the weightings. Equation [5] sums all weightings and sets them equal to one. Equation [6] normalizes the weightings of nearby template body vertices, and likewise, Equation [7] normalizes the weightings of nearby garment vertices. Equations [5] and [6] control the weightings of the nearby template body vertices as compared to the weightings of the nearby garment vertices. In some examples a weighting of $W^b_{sum}:W^g_{sum}=4:1$ may be used.

The weighting equations for all vertices (Equations [1] and [2]) together form three linear Laplacian systems (one for each dimension) as shown at Equations [8], [9] and [10]. The Laplacian systems may be solved (Step 710) in a least-square sense by mapping module 121. The least-square solution may include a Jacobi iterative method or linear algebra methods, such as QR decomposition. Jacobi iterative method is typically less efficient (i.e., slower) than linear algebra methods, but is more versatile as additional constraints may be used during the iterations. Vx, Vy, and Vz are used to denote the x, y, and z coordinates of vertices, respectively. Furthermore, "$Vx_i$," means the x component of the i-th garment vertex, "$W^b_{ij}$," means the weighting of the j-th neighbor garment vertex of the i-th garment vertex, "$Vx^b_{ij}$," means the x component of the j-th neighbor garment vertex of the i-th garment vertex, "$Lx_i$," means the x component of the i-th garment vertex's Laplacian vector, and so on.

Referring to FIG. 8, mapping may be associated with nearby vertices, not points, which can be at any place on the faces or along the edges. The arrows in FIG. 8 generally show the surface normals at each garment and body vertices. For clarity, arrows showing the mapping are not shown, but it is understood that one arrow connects $V_i$ to every mapped vertex. For example, for the non-limiting example of FIG. 8, there may be six such arrows, with four pointing to the four nearby body vertices, and two pointing to the two nearby garment vertices. A set of mock weighting coefficients are also shown on the mapped vertices to illustrate example weightings.

After mapping to the template body mesh (Step 710), the positions of the garment mesh vertices may be determined with respect to the target body mesh (Step 712). Referring to FIGS. 5A-5F, a one-to-one mapping may exist between the template body mesh (FIG. 5A) and the target body mesh (FIG. 5D). A one-to-one mapping between the template and target body meshes is understood to mean that the two meshes have the same connectivity, that is, the same numbers and orders of vertices, faces, and edges. Therefore, the new positions of the vertices on the template body mesh FIG. 5A are mapped to the target body mesh FIG. 5D, and the new positions of the deformed garment mesh vertices are calculated by a Jacobi iterative method in a simple and efficient manner. For example, each face may join the same vertices (e.g., when they are all triangles, the same three vertices), and each edge may connect the same two vertices. That is, the two meshes may only differ on the positions of their vertices.

In some examples where a one-to-one mapping does not exist between the template body mesh and the target body mesh, the target body mesh may be morphed by deformation engine 120 to a version of the template body mesh (or vice versa) that gives the template body mesh and the target body mesh the same connectivity.

Figure 13:
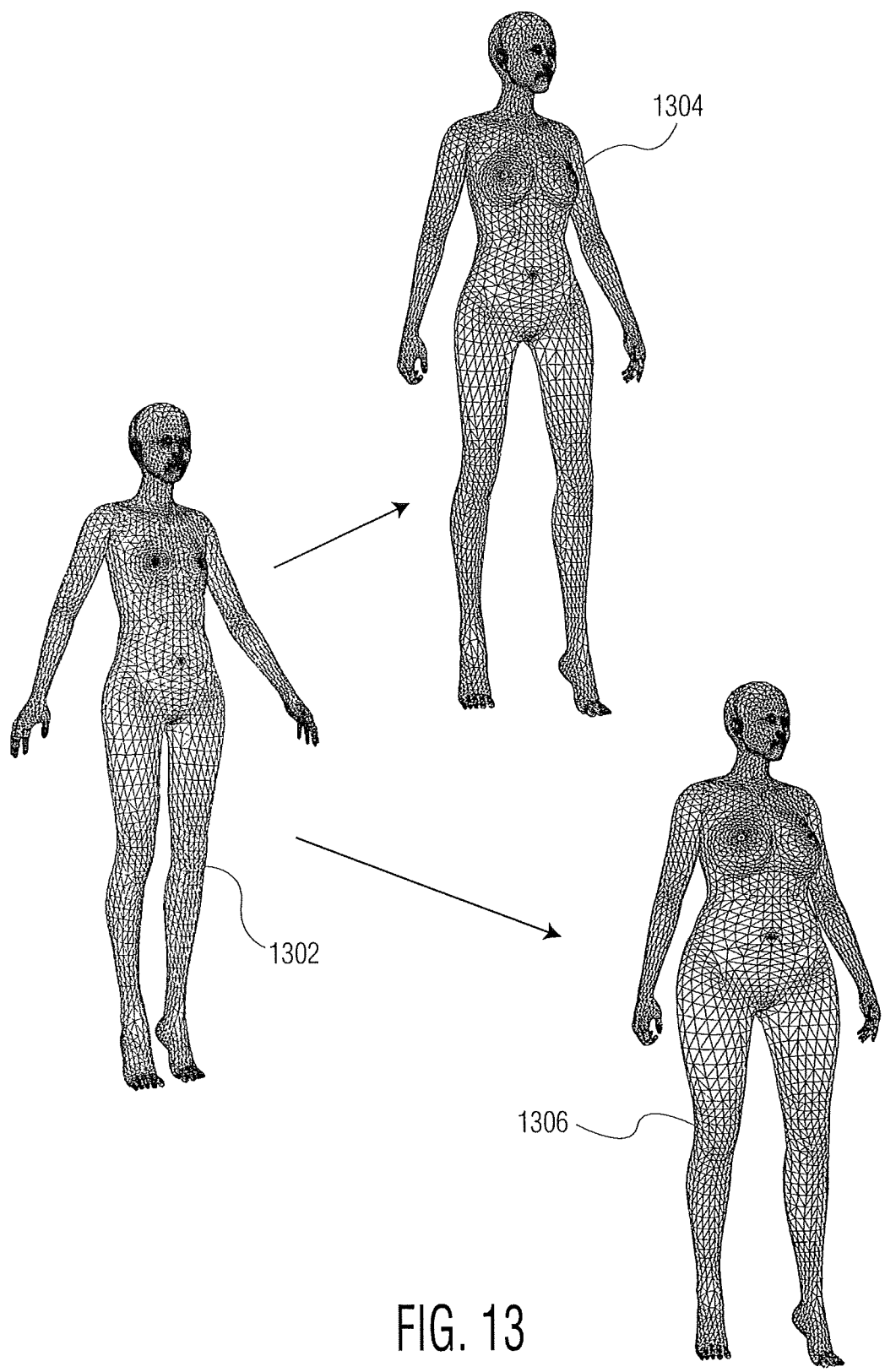
FIG. 13 is an illustration of a body mesh deformation process, used in connection with an aspect of the present disclosure.

Referring to FIG. 13, in some examples, the target body mesh 1306 may be generated by deforming a generic body mesh 1302 (e.g., an average of all human bodies) according to body measurements. The body deformation process may be done by existing morphing techniques (such as, BODYKIT available from Body Labs, Inc., New York City). Therefore, the target body mesh may be determined by a particular set of body measurements, which may be used to deform the generic body mesh 1302. The set of body measurements may be received, for example, from user input. The deformation of the generic body mesh 1302 may also involve small changes of poses, as illustrated in the reposed body mesh 1304.

Figure 14C:
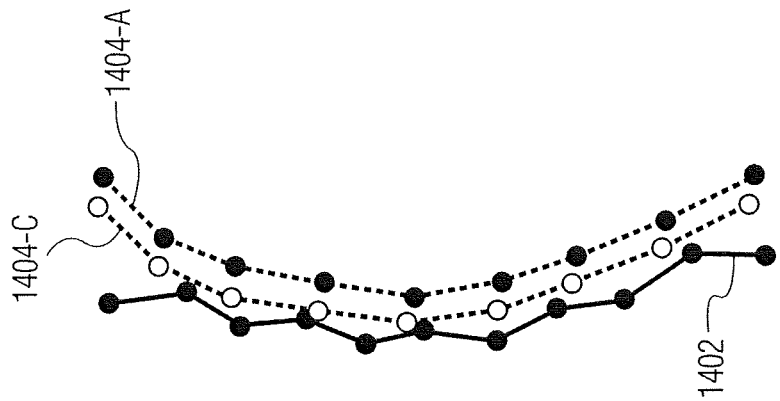
FIGS. 14A, 14B and 14C are two-dimensional illustrations of enlargement of a 3D body mesh in connection with an aspect of the present disclosure.
Figure 14B:
Figure 14A:
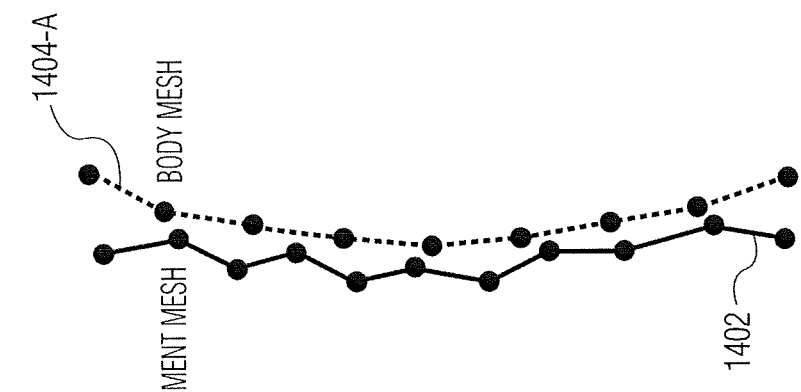

In some examples, to avoid the induced new shape of the mapped garment mesh from intersecting with the target body mesh, an enlargement process may be used by deformation engine 120 may apply an enlargement process during the construction of the mapped garment mesh. As illustrated in FIGS. 14A-14C, a body mesh with a slightly enlarged state, (i.e., an enlarged body mesh), may be created, for example, by moving every vertex of the template body mesh by a small distance along the average normal over a geodesic disk. The positions of the closest points on the template body mesh may be based on the enlarged body mesh, instead of the original mesh. The enlargement process is a simple and effective way to solve intersections between the garment and target body meshes after garment mapping (deformation).

FIG. 14A illustrates a challenging case where the garment mesh 1402 and the template body mesh 1404-A are close to each other. After the template body mesh is deformed 1404-B (see FIG. 14B), at the more contoured parts, there may be intersections between the two meshes. The intersections may be effectively solved by temporarily enlarging the deformed body mesh along the normal directions to create an enlarged body mesh 1404-C, as shown in FIG. 14C. The garment mesh 1402 may be deformed with respect to enlarged body mesh 1404-C. In some examples, the enlargement distance may be kept small to keep the distances between the deformed garment mesh and enlarged body mesh unnoticeable.

Length adjustment module 122 may adjust the vertical length of the mapped garment mesh (Step 716). The mapped garment mesh may be adjusted to compensate for the effect of the garment lengthening during the mapping process. Referring to FIGS. 15A-15C, the length of the mapped garment mesh may be scaled proportionally to the length of the target body mesh with respect to the length of the template body mesh. For example, as shown in FIG. 15B, the target body mesh is taller than the template body mesh of FIG. 15A. During mapping, the mapped garment mesh may also become longer. This may deemed to be an unrealistic lengthening compared to typical garment fitting.

To adjust the length of the mapped garment mesh, a scaling transformation in the vertical direction may be applied by length adjustment module 122 (Step 716) to the mapped garment mesh (Step 714), to scale the overall length of the mapped garment mesh back to the original length as in the received garment mesh (Step 704), while keeping the top of the mapped garment mesh fixed.

For every garment vertex $\{x_i, y_i, z_i\}$:

$$y_i = y_{max} - (y_{max} - y_i)/(y_{max} - y_{min}) * (y^{ori}_{max} - y^{ori}_{min}) \quad [11]$$

Referring to Equation [11], the positive vertical direction is along the positive y axis (e.g., the bigger y, the higher). $y^{ori}_{max}$ and $y^{ori}_{min}$, denote the maximal and minimal y values of the original garment mesh, and $y_{max}$ and $y_{min}$ denote the maximal and minimal y values of the mapped garment mesh. Therefore, the y values of the top of the original and mapped garment meshes are $y^{ori}_{max}$ and $y_{max}$, respectively. The purpose of the equation is to rescale the range of y values of the mapped garment mesh into the range of the original garment mesh while keeping the y value of the top of the garment mesh unchanged. The length adjustment scheme may be parameterless. It may use the original garment mesh and the mapped garment mesh as inputs and may output a length adjusted garment mesh.

FIG. 15A illustrates a received garment mesh fitted to a template body mesh. FIG. 15B illustrates the garment mesh mapped onto a taller target body mesh without length adjustment. The top of the garment meshes in both FIG. 15A and FIG. 15B are held fixed relative to Line A-A. The length of the mapped garment mesh in FIG. 15B has increased, to below Line B-B (which is the length of the original garment mesh as shown in FIG. 15A). FIG. 15C illustrates the garment mesh mapped onto the same taller body mesh of FIG. 15B but with length scaled back to its original value along Line B-B, to form a length adjusted garment mesh. Length adjustment module 122 may simultaneously use a collision detection and response process with the target body mesh (during Step 716) to avoid intersections between the length adjusted garment mesh and the target body mesh.

Reconstruction module 123 may reconstruct the length adjusted garment mesh (Step 718), to remove any local defects formed during the mapping and length adjustment process. For example, at the end of the mapping process, the shape of the mapped garment mesh is largely solved. However, local defects, such as self-intersections, may still exist. To remove these defects, a Laplacian-based reconstruction process may be performed by reconstruction module 123 (Step 718). The Laplacian coordinates of every length-adjusted garment mesh vertex, i.e., the difference between each vertex and the average position of its neighbors, is first calculated over the length-adjusted garment mesh. Based on the Laplacian coordinates, a Jacobi iterative method may be used to induce the final positions of the garment mesh vertices, starting from the vertex positions induced from the length-adjusted garment mesh, to form a reconstructed garment mesh. A collision detection and response process with the target body mesh may be performed simultaneously, to avoid intersections between the reconstructed garment mesh and the target body mesh. The finally reconstructed garment mesh forms the deformed garment mesh.

In general, a collision detection and response process of reconstruction module 123 may use three inputs: a moving object, the target positions of the moving object, and a static object. Collisions may occur between moving and static objects. The moving object may be the garment mesh moving from the original shape toward its deformed (mapped) shape. The static object may be target body mesh. The collision detection/response process may include an iterative process. At each iteration, the moving object would move toward its target position. Practically, this means that for every vertex of the moving object, it is given a moving path starting from its current position to its target position. However, a moving path may collide with some face (or faces) of the new body mesh (i.e., the static object). Should collision happen, the moving vertex is stopped short at the first point of collisions. At the next iteration, for those moving vertices with collisions, they would start at their stopped positions at the previous iteration. For those moving vertices without collisions, they already arrive at their target positions and would not move anymore. Iterations may stop when a time limit is reached or all vertices have reached their target positions (meaning that no vertex would move anymore). In some examples, reconstruction module 123 may use a discrete oriented polytope-based (k-DOP) spatial partition technique may be used to speed up the process to find potential triangles of the new body mesh that may be hit by a moving path.

In summary, at the end of the deformation process (FIG. 7), the deformed garment mesh is deformed with respect to the shape of the target body mesh. Compared to the received garment mesh, the deformed garment mesh retains the same level of tightness to the target body mesh, retains the overall length, and retains geometric details. The deformed garment mesh is free of self-intersections and intersections with the target body mesh. The mapping between the original garment mesh and the template body mesh is preserved. The mapping can be understood as the offsets, or "Laplacians", from the nearby avatar (i.e., body) parts. For instance, a tight cloth can be defined by a short and uniform offset from the template body mesh, while a loose cloth may be defined by larger and more complex offsets. Details, such as wrinkles and drapes, are then naturally defined by such offsets. The mapping deformation process represents a geometry-based approach that generates a deformed garment mesh without using physical-based techniques (such as physical cloth simulation).

Figure 16:
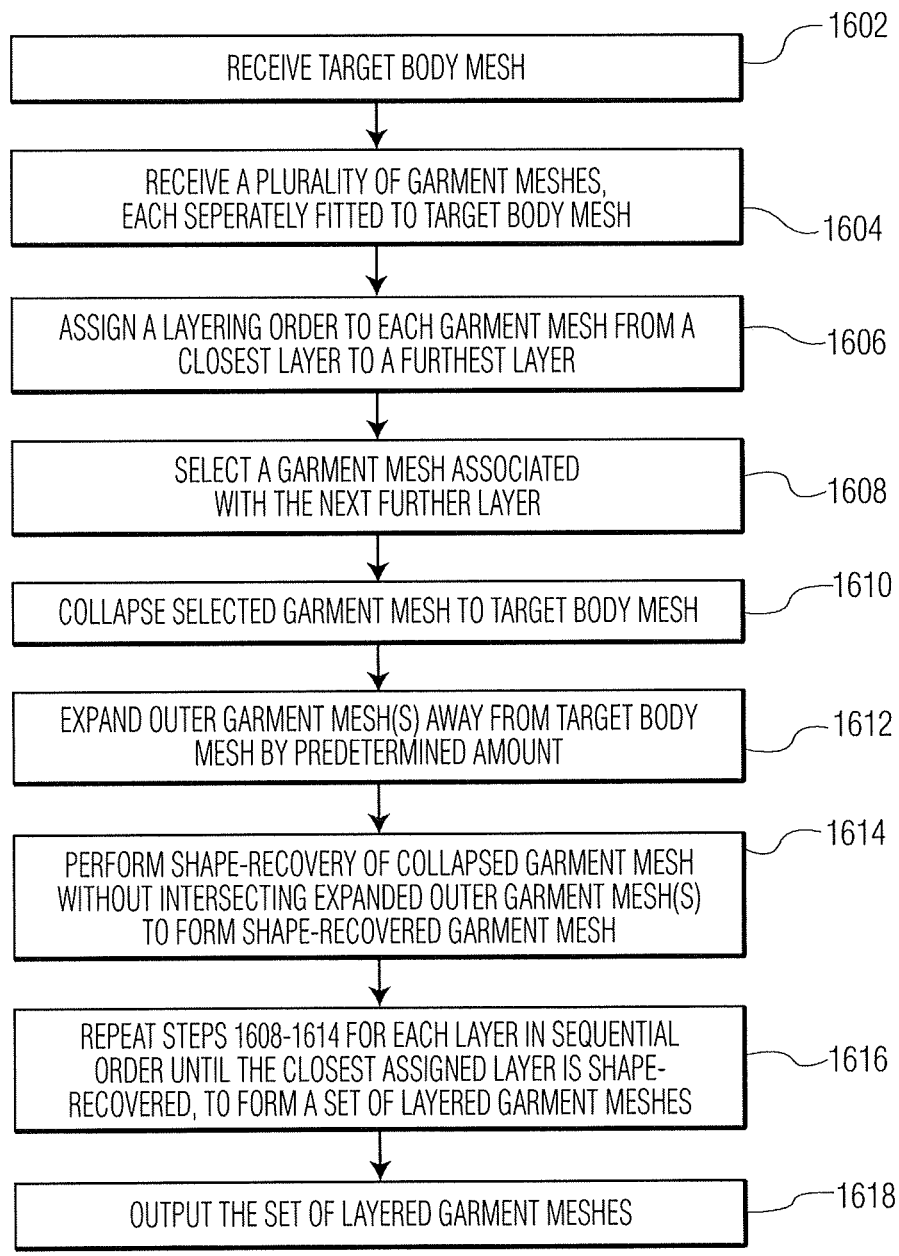
FIG. 16 is a flowchart diagram of an example method of garment layering associated with the system shown in FIG. 1, according to an aspect of the present disclosure.

Turning now to FIG. 16, a flowchart diagram is shown of an example method of a garment layering process associated with system 100 (FIG. 1), according to an aspect of the present disclosure. In FIG. 16, it is understood that some of the steps may be performed by system 100 concurrently with other steps or a combination of steps, or may be performed in a different sequence than shown. The steps in FIG. 16 may be performed by layering engine 130. Although layering of two or more garment meshes is described below, it is understood that the same process may be performed on two or more deformed garment meshes received from deformation engine 120.

At Step 1602, a target body mesh may be received by input interface 110. At Step 1604, a plurality of garment meshes (i.e., two or more garment meshes), each separately fitted to the target body mesh, may be received by input interface 110. The garment meshes may be in a geometric shape as if they are worn on (i.e., mapped to) the target body mesh. In some examples, the shape of the garment meshes may be induced from prior cloth simulations, 3D scans from real-world sources, or created by 3D artists. In some examples, the shape of the template body mesh may be from a 3D scan of a physical body or directly created by 3D artists, and may be from a real human body or an artificial mannequin. In some examples, all of the garment meshes and the target body mesh may have no self-intersections, and no intersections may exist between each of the garment meshes and the target body mesh. However, in some examples, intersections may exist between the garment meshes.

At Step 1606, a layering order may be assigned to each of the received garment meshes in a sequential order from a closest layer to a furthest layer, based on the distance of the received garment mesh from the received target body mesh, by layering engine 130. In some examples, the layering order may be received from optional user interface 150. In some examples, the layering order may be previously assigned to each garment mesh. In some examples, the layering order may be retrieved from data storage 190. It is understood that there may be more than one possible layering order for multiple garments, which may lead to different layering results. Each received garment mesh may be assigned to a layer based on the placement of the garment in relation to the target body mesh. The garment mesh with the least distance (i.e., closest) from the target body mesh may be assigned to the closest layer. The garment mesh with the next least distance from the target body mesh is assigned to the next further layer. The assignations may continue until the garment mesh with the greatest distance (i.e., furthest) to the target body mesh is assigned to the furthest layer, and all garment meshes have been assigned to a layer in a sequential order.

At Step 1608, a garment mesh associated with the next further layer, according to the sequential order, is selected by layering engine 130. At Step 1610, the selected garment mesh is collapsed onto the target body mesh, for example, by collapse module 131.

At Step 1612, expand module 132 may expand outer garment mesh(s) away from the target body mesh by a predetermined amount (e.g., a cloth thickness) with respect to the normal direction, to form expanded outer garment mesh(s). The outer garment mesh(s) represent garment meshes further away from the currently selected garment mesh in the assigned layering order. The expansion of the outer garment mesh(s) may be used to compensate for the selected (inner) mesh that will be tucked inside the outer garment mesh(s).

At Step 1614, shape-recover module 133 may perform a shape-recovery of the collapsed garment mesh relative to the expanded outer garment mesh(s). The shape-recovery recovers the shape of the previously collapsed selected mesh toward its original shape while avoiding collision with the target body mesh and the expanded outer garment mesh(s).

At Step 1616, Steps 1608-1614 may be repeated until the closest assigned layer is layered, to form a set of layered garment meshes. At Step 1618, the set of layered garment meshes may be outputted by output interface 140.

In general, the set of layered garment meshes are fitted onto the target body mesh according to their positions in the assigned layering order. Accordingly, the layering process receives garment meshes that are separately and individually fitted to a target body mesh, and deforms each garment mesh, one at a time, such that all of the garment meshes are layered on the target body mesh while resolving any intersections between multiple garment meshes when combined according to the layering order. The layering process may generate small-scale modifications to each garment mesh to avoid intersections during the layering. Like the deformation process of deformation engine 120, the layering process of layering engine 130 may perform the layering process by a geometrical algorithm without use of physical cloth simulation techniques.

The layering process is illustrated at FIGS. 6A-6H. Inputs to the layering process include a polygonal mesh representing the shape of a human body (i.e., the body mesh) FIG. 6A, a set of polygonal meshes representing the shapes of a set of garments that were each individually mapped to a template body mesh (i.e., the garment meshes) FIGS. 6B-6D, and an assignment of a sequential order of the set of garments that defines the layering order—from the closest layer (closest to the target body mesh) to the furthest layer (farthest from the target body mesh).

FIG. 6E illustrates a comparative example of the target body mesh FIG. 6A and the three garment meshes FIGS. 6B-6D put together without the layering process of the present disclosure. Inset FIG. 6F shows an area near the waist with severe intersections. FIG. 6G illustrates the target body mesh FIG. 6A and the three garment meshes FIGS. 6B-6D put together according to the layering system and method of the present disclosure. Inset FIG. 6H illustrates that all intersections are resolved according to the layering order, for example, shirt-skirt-jacket layering order.

A goal of the layering process is to layer the garment meshes onto a new geometric shape, (i.e., the target body mesh) in a manner that may satisfy certain criteria. A first criteria includes no intersections between any pair of the garment meshes. A second criteria includes no intersections between each of the garment meshes and the target body mesh. A third criteria includes that the layered garment meshes stay as close as possible to their original shapes.

Given the layering order, the layering process iteratively layers one garment mesh at a time. At each iteration, one garment mesh is layered with respect to all the garment meshes that are further (i.e., a greater distance from the target body mesh) to it. The method may start with selecting the second furthest garment (Step 1608), and sequentially proceeds to the next closer garment, until the closest garment is layered. For example, given a shirt-skirt-jacket layering order, the method layers the skirt with respect to the jacket at the first iteration, then deforms the shirt with respect to both the skirt and jacket at the second iteration.

At each iteration, the garment mesh to be layered may be denoted as the selected (inner) garment mesh, and all the garment meshes that are further to the selected garment mesh may be denoted as the outer meshes by layering engine 130. The layering proceeds in three stages at each iteration. First, a collapse step (Step 1610) where the selected garment mesh is collapsed completely onto the target body mesh. Second, an expand step (Step 1612) where all the outer meshes are slightly expanded to make room for the selected garment mesh to be tucked inside. Third, a shape-recovery step (Step 1614) where the shape of the previously collapsed selected (inner) mesh is recovered toward its original shape while collision with the target body mesh and the outer meshes are averted. In general, the furthest layer is relatively unchanged (except for the expansion step) while the other layers are layered once.

For instance, assume there are n garment layers, $L_0$, $L_1, \ldots, L_N$, assigned in a sequential order from closest layer to a furthest layer. Initially, the layers may intersect with each other. The layering process may assume that the outermost layer ($L_N$) is fixed (besides being slighted expanded by the expansion step, Step 1612). The second-furthest layer ($L_{N-1}$) may be expanded against the furthest layer ($L_N$) to resolve intersections with the furthest layer. Afterwards, the second-furthest layer ($L_{N-1}$) should be free of intersections with the furthest layer. The third-most furthest layer ($L_{N-2}$) is then expanded against the layers that are further to it (i.e., the second-furthest layer ($L_{N-1}$) and the furthest layer ($L_N$)). At the end of this expansion step, the third-furthest layer to the furthest layer would all be free of intersections with each other. The process may be repeated until the closest garment layer is also expanded. In the end, all layers should be free of intersections with each other.

In some examples, the layering process may use uv parameterization, uv coordinates and uv mapping for the collapse step (Step 1610). As a result of aligning body meshes and garment meshes, only some of the garment mesh vertices, namely the ones that are close enough to the body mesh by a distance threshold and with surface normal deviations below a threshold, explicitly "know" where to collapse to. For example, referring to FIG. 17B, these are the vertices marked with arrows, and hereinafter are referred to as mapped vertices. For the remainder of the garment mesh vertices, i.e., the non-mapped vertices, their target collapsing positions may be determined from the average position of nearby garment vertices. The average of their 3D positions may not determined directly, as the results may be incorrect. Instead, the average includes their positions on the body mesh, which are described as uv coordinates. Therefore, a uv mapping of the body mesh may be used. For uv mapping, the average of any combinations of the uv coordinates should still be inside the uv mapping. This means that the shape of the uv mapping may be convex. The simplest form of a convex shape is a disk (i.e., one chart and with the boundary equivalent to a circle). The Laplacian smoothing process over the uv values may be performed by continuously and iteratively averaging of the uv values until convergence or a time limit is reached.

A goal of the collapse step (Step 1610) may be to completely collapse the selected garment mesh onto the target body mesh. FIGS. 17A-17C illustrate the collapse process. FIG. 17A shows a garment mesh 1702 (shown as a solid line) and a target body mesh 1704 (shown as a dotted line). It is understood that target body mesh 1704 is facing leftward, and selected garment mesh 1702 is positioned at a further position from target body mesh 1704. For each target body mesh vertex 1706, a one-dimensional uv parameterization (herein further referred to as a uv coordinate), ranging from 0 to 1, is given. The mapping is subject to a distance and an angle threshold measuring the alignment of the surface normals on selected garment mesh 1702 and target body mesh 1704, so the mapping may be null for some (e.g., those vertices that are too far away from the body mesh).

First, a mapping from each of the selected garment mesh vertices to the closest point on target body mesh 1704 is found (by collapse module 131). FIG. 17B shows selected garment mesh vertices which are within a predetermined threshold (for clarity, the thresholds are not shown) are mapped to the closest point on target body mesh 1704 and inherit the corresponding one-dimensional uv coordinates. These garment mesh vertices are marked with arrows and their inherited uv coordinates are indicated. In some examples, garment mesh vertices meeting the predetermined threshold may be only a subset of all the garment mesh vertices. Garment mesh vertices not meeting the predetermined threshold (i.e., null mapping) may be given uv coordinates by a conventional interpolation/extrapolation scheme. Any real number between 0 to 1 (i.e., a one-dimensional uv coordinate) identifies a unique position on the target body mesh.

Figure 18A:
FIGS. 18A and 18B are illustrations of a 3D garment mesh before and after being collapsed onto a body mesh, according to an aspect of the present disclosure.
Figure 18B:
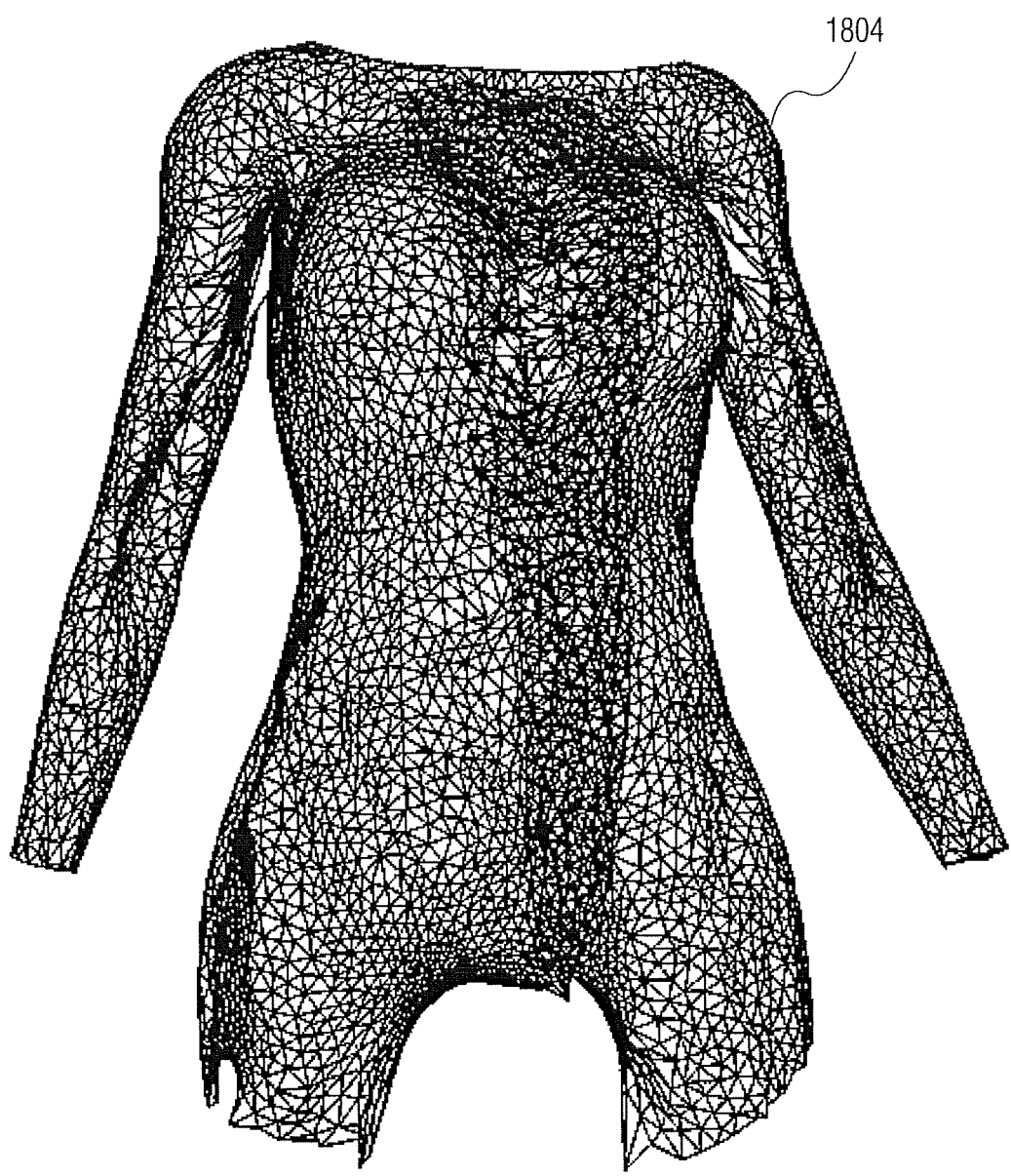

As shown in FIG. 17C, the garment mesh vertices may be mapped onto target body mesh 1704 according to their inherited uv coordinates to form a collapsed garment mesh 1702' having vertices 1708. The uv mapping includes exactly one chart and the boundary is equivalent to a circle and may be generated by a uv mapping using known parameterization techniques. In some examples, the vertices with null mapping may be given their uv coordinates by extrapolation using a Laplacian smoothing over the uv values of the vertices. Since a uv coordinate defines a unique position on the target body mesh, the selected garment mesh may be collapsed onto target body mesh 1704 by moving every vertex to the corresponding position on target body mesh 1704 according to its uv value, to form collapsed garment mesh 1702'. FIG. 18A illustrates a selected garment mesh 1802, and FIG. 18B illustrates the selected garment mesh 1802 as a collapsed garment mesh 1804 by according to Step 1610.

After forming the collapsed garment mesh, all of the outer garment meshes may be slightly expanded (Step 16120, along the direction of the normals, to make room for the collapsed garment mesh to be tucked inside. In some examples, the distance of the expansion may roughly equal the thickness of the cloth of the collapsed (inner) garment mesh. Given a garment mesh, a first step may be to estimate the surface normals at every vertex. Estimation of the surface normal may be performed by averaging the triangle normals over a neighborhood of the vertex. Afterwards, each vertex of the collapsed garment mesh may be moved by a given distance along its surface normal. FIG. 19 illustrates a garment mesh 1902 mapped to an expanded garment mesh 1904 (Step 1612).

The layering process further includes a shape-recover step (Step 1614), where the shape of the previously collapsed garment mesh is recovered toward its original shape while collisions with the body mesh and the further meshes are averted. In some examples, shape-recover module 133 may use a Laplacian-based reconstruction process. One technique to encode the 3D shape of a mesh is by giving each vertex a 3D position. Alternatively, the 3D shape of a mesh may be encoded as the differentials of each vertex against the weighted average of its neighbors. Such differentials are called Laplacian coordinates. Laplacian coordinates are also three-dimensional, but do not define an exact position in 3D space. Instead, Laplacian coordinates define a differential vector from the weighted average of its neighbors. Laplacian coordinates may be interpreted as equations. Putting the Laplacian coordinates of all the vertices together, results in a linear system. Solving the linear system in a least-square sense results in the actual 3D positions of the vertices. Typically, the 3D positions of some of the vertices are fixed, so this least-square problem has a unique solution.

The Laplacian coordinates of every garment mesh vertex (i.e., the difference between each vertex and the average position of its neighbors) may be calculated over the original shape of the garment mesh (by shape-recover module 133). Then, based on these Laplacian coordinates, a Jacobi iterative method may be used to induce the final positions of the garment mesh vertices, starting from the vertex positions of the collapsed inner mesh. A collision detection and response process with the target body mesh and the (expanded) outer meshes may be taken simultaneously to avoid intersections between the collapsed garment mesh and the target body mesh, as well as the further meshes.

Accordingly, the collapsed garment mesh may be recovered towards its original shape by iteratively moving each of the collapsed garment mesh vertices back according to their Laplacian coordinates. The target body mesh and the outer garment meshes may serve as collision targets, which may prevent the collapsed garment mesh from completely regain its original shape. The parts of the collapsed garment mesh that are not blocked may regain their original shape, while the parts of the collapsed garment mesh that are blocked will be prevented form regaining its original shape.

FIG. 20A shows selected garment mesh 2002-A (solid line) in its original shape and target body mesh 2004 (dotted line). FIG. 20B shows collapsed garment mesh 2002-B collapsed inside target body mesh 2004. FIG. 20C shows outer garment mesh 2006 as the collision target. As can be seen in FIG. 20C, an upper part of shape-recovered mesh 2002-C has completely regained its original shape, but the shape-recovery of a lower part of shape-recovered mesh 2002-C is blocked by outer mesh 2006, by using a collision detection and response process. The resulting set of layered garment meshes causes shape-recovered mesh 2002-C to appear to be tucked inside outer mesh 2006.

Systems and methods of the present disclosure may include and/or may be implemented by one or more specialized computers including specialized hardware and/or software components. For purposes of this disclosure, a specialized computer may be a programmable machine capable of performing arithmetic and/or logical operations and specially programmed to perform the functions described herein. In some embodiments, computers may include processors, memories, data storage devices, and/or other commonly known or novel components. These components may be connected physically or through network or wireless links. Computers may also include software which may direct the operations of the aforementioned components. Computers may be referred to with terms that are commonly used by those of ordinary skill in the relevant arts, such as servers, personal computers (PCs), mobile devices, and other terms. It should be understood that those terms used herein are interchangeable, and any special purpose computer capable of performing the described functions may be used.

Computers may be linked to one another via one or more networks. A network may be any plurality of completely or partially interconnected computers wherein some or all of the computers are able to communicate with one another. Connections between computers may be wired in some cases (e.g., via wired TCP connection or other wired connection) or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network. Networks may include, for example, a private network (e.g., a local area network (LAN), a wide area network (WAN), intranet, etc.) and/or a public network (e.g., the Internet).

Figure 21:
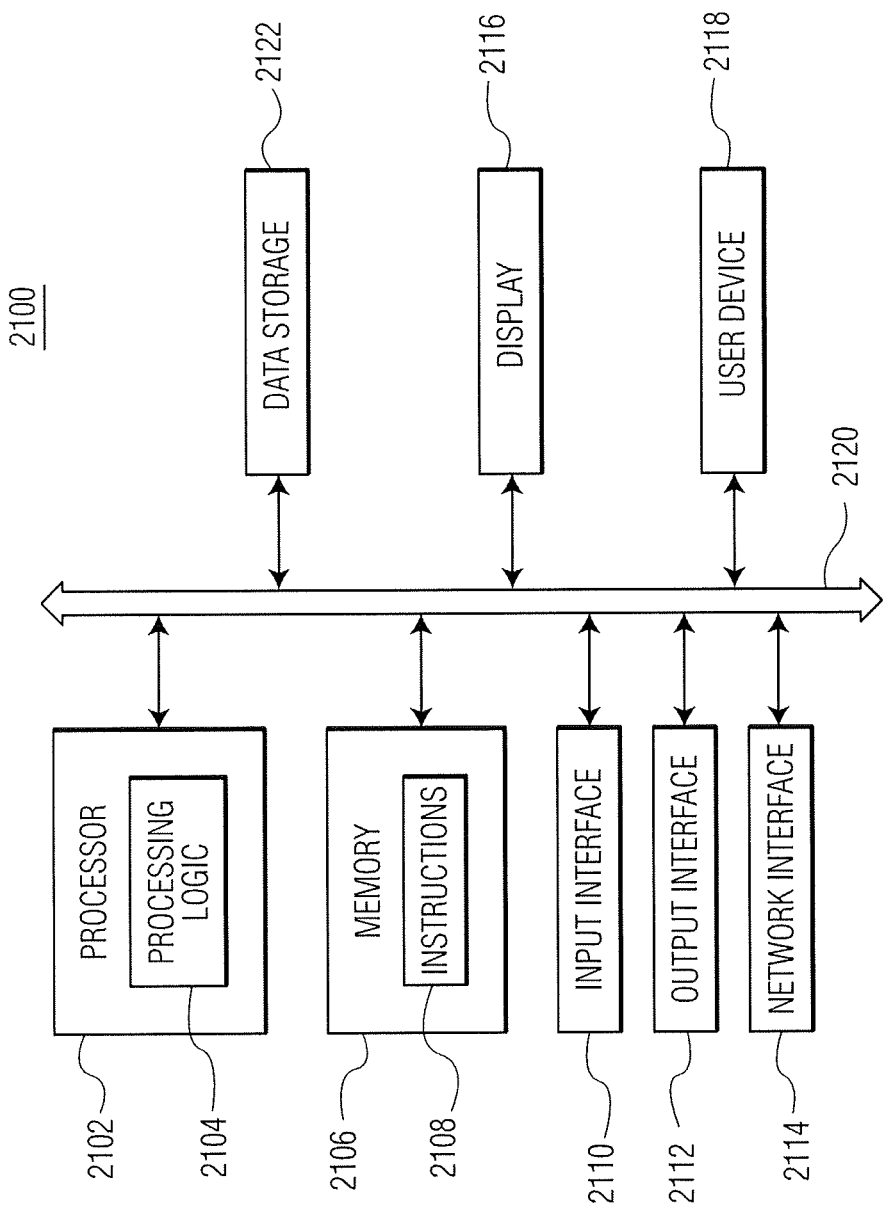
FIG. 21 is a functional block diagram of an example computer system, according to an aspect of the present disclosure.

FIG. 21 illustrates a functional block diagram of a machine in the example form of computer system 2100 within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, system 100 (FIG. 1) may be implemented by the example machine shown in FIG. 21 (or a combination of two or more of such machines).

Example computer system 2100 may include processor 2102, memory 2106, data storage 2122, input interface 2110 and output interface 2112, which may communicate with each other via data and control bus 2120. In some examples, computer system 2100 may also include display 2116 and/or user interface 2118.

Processor 2102 may include, without being limited to, a microprocessor, a central processing unit, an application specific integrated circuit (ASIC), a field programmable gate array (FPGA), a digital signal processor (DSP) and/or a network processor. Processor 2102 may be configured to execute processing logic 2104 for performing the operations described herein. In general, processor 2102 may include any suitable special-purpose processing device specially programmed with processing logic 2104 to perform the operations described herein.

Memory 2106 may include, for example, without being limited to, at least one of a read-only memory (ROM), a random access memory (RAM), a flash memory, a dynamic RAM (DRAM) and a static RAM (SRAM), storing computer-readable instructions 2108 executable by processor 2102. In general, memory 2106 may include any suitable non-transitory computer readable storage medium storing computer-readable instructions 2108 executable by processor 2102 for performing the operations described herein. Although one memory 2108 is illustrated in FIG. 21, in some examples, computer system 2100 may include two or more memory devices (e.g., dynamic memory and static memory).

Computer system 2100 may include network interface 2114, for direct communication with other computers (including wired and/or wireless communication) and/or for communication with network(s). In some examples, computer system 2100 may include display 2116 (e.g., a liquid crystal display (LCD), a touch sensitive display, etc.). In some examples, computer system 2100 may include user device 2118 (e.g., an alphanumeric input device, a cursor control device, etc.).

In some examples, computer system 2100 may include data storage 2122 storing instructions (e.g., software) for performing any one or more of the functions described herein. Data storage 2122 may include any suitable non-transitory computer-readable storage medium, including, without being limited to, solid-state memories, optical media and magnetic media.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A system for deforming a polygonal mesh representing a garment fitted on a template body to a target body, the system comprising:

an input interface configured to:
receive a target body mesh representing the target body,
receive a template body mesh having a plurality of template body vertices and representing the template body, the target body mesh different from the template body mesh, and
receive a garment mesh having a plurality of garment vertices and representing the garment, the garment mesh fitted to the template body mesh;

a deformation engine configured to:
deform the garment mesh to the target body mesh by a geometrical deformation algorithm, the geometrical deformation algorithm comprising, for each garment vertex:
identifying one or more of the template body vertices and one or more others of the garment vertices each within a predetermined threshold of said garment vertex,
applying a predetermined weighting to the one or more identified template body vertices and the one or more identified others of the garment vertices,
mapping said garment vertex to the one or more identified template body vertices based on a sum of the weighted template body vertices and the weighted garment vertices, determining a position of the mapped garment vertex relative to the target body mesh based on a mapping between the template body mesh and the target body mesh, such that said garment vertex is deformed according to the position, and repeating the identifying, applying, mapping and determining steps for each garment vertex of said plurality of garment vertices of said garment mesh to form a deformed garment mesh fitted to the target body mesh; and an output interface configured to output the deformed garment mesh.

2. The system of claim 1, wherein the deformation engine further comprises a length adjustment module configured to adjust a length of the deformed garment mesh relative to a length of the received garment mesh.

3. The system of claim 1, wherein the deformation engine further comprises a reconstruction module configured to remove at least one of self-intersections of the deformed garment mesh and intersections between the deformed garment mesh and the target body mesh.

4. The system of claim 1, wherein the predetermined threshold includes at least one of a predetermined distance threshold and a predetermined angle threshold.

5. The system of claim 1, wherein the target body mesh includes at least one of a different shape, a different size and a different pose than the template body mesh.

6. The system of claim 1, wherein the deformation engine is configured to enlarge the template body mesh by a predetermined amount prior to said identifying step, such that the mapping of said garment vertex includes mapping of said garment vertex according to the enlarged template body mesh.

7. The system of claim 6, wherein the deformation engine is configured to perform said mapping according to the enlarged body mesh to reduce intersections between the deformed garment mesh and the target body mesh.

8. The system of claim 1, wherein the garment mesh includes a plurality of garment meshes, and the deformation engine is configured to deform each of the plurality of garment meshes to the target body mesh to form a respective plurality of deformed garment meshes.

9. The system of claim 8, wherein the plurality of garment meshes are each separately fitted to the template body mesh.

10. The system of claim 8, wherein the template body mesh includes a plurality of different template body meshes, and each garment mesh of the plurality of garment meshes is separately fitted to a respective one of the plurality of different template body meshes.

11. The system of claim 8, further comprising a layering engine configured to:
assign a layering order to each of the plurality of deformed garment meshes from a closest layer to a furthest layer relative to the target body mesh; and
perform a layering process for each deformed garment mesh in the assigned layering order other than the furthest layer, according to a sequential order defined as a next furthest layer to the closest layer to form a set of layered garment meshes.

12. The system of claim 11, wherein said layering process comprising for each deformed garment mesh in the sequential order, further deforming said respective deformed garment mesh relative to at least one outer layer farther from said deformed garment mesh in the layering order such that said deformed garment mesh does not intersect the at least one outer layer and the target garment mesh.

13. A method for deforming a polygonal mesh representing a garment fitted on a template body to a target body, the method comprising:
receiving, by an input interface, a target body mesh representing the target body;
receiving, by the input interface, a template body mesh having a plurality of template body vertices and representing the template body, the target body mesh different from the template body mesh;
receiving, by the input interface, a garment mesh having a plurality of garment vertices and representing the garment, the garment mesh fitted to the template body mesh;
deforming, by a deformation engine, the garment mesh to the target body mesh by a geometrical deformation algorithm, the geometrical deformation algorithm comprising, for each garment vertex:
identifying one or more of the template body vertices and one or more others of the garment vertices each within a predetermined threshold of said garment vertex,
applying a predetermined weighting to the one or more identified template body vertices and the one or more identified others of the garment vertices,
mapping said garment vertex to the one or more identified template body vertices based on a sum of the weighted template body vertices and the weighted garment vertices, and
determining a position of the mapped garment vertex relative to the target body mesh based on a mapping between the template body mesh and the target body mesh, such that said garment vertex is deformed according to the position, and
repeating the identifying, applying, mapping and determining steps for each garment vertex of said plurality of garment vertices of said garment mesh to form a deformed garment mesh fitted to the target body mesh; and
outputting, by an output interface, the deformed garment mesh.

14. The method of claim 13, the method further comprising adjusting a length of the deformed garment mesh relative to a length of the received garment mesh.

15. The method of claim 14, wherein the adjusting of the length of the deformed garment mesh comprises applying a scaling transformation and simultaneously performing a collision detection and response process.

16. The method of claim 13, the method further comprising reconstructing the deformed garment mesh to remove at least one of self-intersections of the deformed garment mesh and intersections between the deformed garment mesh and the target body mesh.

17. The method of claim 16, wherein the reconstructing of the deformed garment mesh comprises performing a Laplacian-based reconstruction process simultaneously with performing a collision detection and response process.

18. The method of claim 13, wherein the target body mesh includes at least one of a different shape, a different size and a different pose than the template body mesh.

19. The method of claim 13, the method further comprising, prior to the identifying of said template body vertices:
enlarging the template body mesh by a predetermined amount; and
mapping of said garment vertex according to the enlarged template body mesh, said mapping according to the enlarged body mesh configured to reduce intersections between the deformed garment mesh and the target body mesh.

20. The method of claim 13, wherein the garment mesh includes a plurality of garment meshes, and the deforming of the garment mesh includes deforming each of the plurality of garment meshes to the target body mesh to form a respective plurality of deformed garment meshes.

21. The method of claim 20, wherein the plurality of garment meshes are each separately fitted to the template body mesh.

22. The method of 20, wherein the template body mesh includes a plurality of different template body meshes, and each garment mesh of the plurality of garment meshes is separately fitted to a respective one of the plurality of different template body meshes.

23. A method for layering a plurality of polygonal meshes representing a plurality garments fitted on a target body, the method comprising:
  receiving, by an input interface, a target body mesh representing the target body;
  receiving, by the input interface, a plurality of garment meshes representative of the respective plural garments, each garment mesh of the plurality of garment meshes including a plurality of garment mesh vertices and separately fitted to the target body mesh;
  assigning a layering order to each of the plurality of garment meshes from a closest layer to a furthest layer with respect to the target body mesh;
  performing, by a layering engine, a layering process for each assigned layer, according to a sequential order from a next furthest layer to the closest layer, said layering process comprising, for each garment mesh of the plurality of garment meshes in the sequential order:
    collapsing the garment mesh onto the target body mesh by mapping each vertex of the garment mesh to a respective corresponding location on the target body mesh, to form a collapsed garment mesh;
    expanding at least one outer garment mesh farther from said garment mesh in said layering order away from the target body by a predetermined amount to form at least one expanded outer garment mesh;
    performing a shape-recovery of the collapsed garment mesh by deforming each vertex of the collapsed garment mesh toward the at least one expanded outer garment mesh without intersecting said expanded outer garment mesh, to form a shape-recovered garment mesh for said corresponding assigned layer;
    repeating the collapsing, expanding and shape-recovery steps until a shape-recovered garment mesh is generated for the closest layer, to form a set of layered garment meshes; and
  outputting, by an output module, the set of layered garment meshes.

24. The method of claim 23, wherein the expanding of the at least one outer garment mesh includes expanding the at least one outer garment mesh by the predetermined amount along a respective normals direction.

25. The method of claim 23, wherein the predetermined amount for expanding the at least one outer garment mesh includes a thickness of the garment mesh being collapsed.

26. The method of claim 23, wherein the performing of the shape-recovery includes removing at least one of self-intersections of the shape-recovered garment mesh, intersections between the shape-recovered garment mesh and the target body mesh and intersections between the shape-recovered garment mesh and the at least one expanded outer garment mesh.

27. The method of claim 26, wherein the shape-recovery includes performing a Laplacian-based recovery process simultaneously with a collision detection and response process.

28. The method of claim 23, wherein the layering order is received, by a user interface, as a user-specified preference.

* * * * *